United States Patent [19]

Mackrle et al.

[11] Patent Number: 5,720,876
[45] Date of Patent: Feb. 24, 1998

[54] REACTOR FOR BIOLOGICAL SEWAGE PURIFICATION

[76] Inventors: Svatopluk Mackrle, Pavllkova 5, 602 00, Brno, Czech Rep.; Vladimir Mackrle, 1 Máje 12, 900 44, Tomášov, Czech Rep.

[21] Appl. No.: 501,061

[22] PCT Filed: Feb. 7, 1994

[86] PCT No.: PCT/CZ94/00006

§ 371 Date: Aug. 11, 1995

§ 102(e) Date: Aug. 11, 1995

[87] PCT Pub. No.: WO94/18131

PCT Pub. Date: Aug. 18, 1994

[30] Foreign Application Priority Data

| Feb. 15, 1993 | [CZ] | Czech Rep. | 0201-93 |
| Jul. 26, 1993 | [CZ] | Czech Rep. | 1507-93 |
| Jan. 31, 1994 | [CZ] | Czech Rep. | 0201-94 |

[51] Int. Cl.$^6$ .................. C02F 3/30; C02F 3/12
[52] U.S. Cl. ............. 210/197; 210/208; 210/219; 210/256
[58] Field of Search .................. 210/605, 629, 210/230, 196, 197, 207, 208, 218–220, 221.1, 256, 261, 262, 903

[56] References Cited

U.S. PATENT DOCUMENTS

| 4,033,875 | 7/1977 | Besik | 210/197 |
| 4,054,524 | 10/1977 | Mackrle et al. | 270/195.1 |
| 4,139,457 | 2/1979 | Mackrle et al. | 210/194 |
| 4,341,630 | 7/1982 | Mackrle et al. | 210/221.2 |
| 4,390,422 | 6/1983 | Mackrle et al. | 210/188 |
| 4,430,215 | 2/1984 | Mackrle et al. | 210/195.4 |
| 4,585,556 | 4/1986 | Mackrle et al. | 210/221.1 |
| 4,664,794 | 5/1987 | Mackrle et al. | 210/188 |
| 4,707,252 | 11/1987 | Durot et al. | 210/197 |
| 5,032,276 | 7/1991 | Mackrle et al. | 210/629 |
| 5,240,600 | 8/1993 | Wang et al. | 210/197 |
| 5,573,671 | 11/1996 | Klein | 210/218 |

FOREIGN PATENT DOCUMENTS

| 0338182 | 10/1989 | European Pat. Off. . |
| 0345669 | 12/1989 | European Pat. Off. . |
| 0367756 | 5/1990 | European Pat. Off. . |
| 8812919 | 1/1989 | Germany . |

*Primary Examiner*—Thomas G. Wyse
*Attorney, Agent, or Firm*—Beveridge, DeGrandi, Weilacher & Young, LP

[57] ABSTRACT

Reactor for biological sewage purification having a tank with a casing and a bottom surface and a funnel-shaped member in the tank. An activation space is defined between the casing and the funnel-shaped member and a separation space is defined inside the funnel-shaped member with a passage in the funnel-shaped member for communication between both spaces. A partition extends from the casing to the funnel-shaped member. A recirculation means defines an inlet communicating with the separation spaces and an outlet communicating with the activation space. A circulation circuit is formed for circulating fluid between the activation space and the separation space.

32 Claims, 12 Drawing Sheets

REACTOR FOR BIOLOGICAL SEWAGE PURIFICATION

The present invention relates to a reactor for biological sewage purification with activated sludge comprising an activation space and an upwards funnel shape separation space for fluidized bed filtration, especially suitable for purification of smaller and the smallest individual sources of sewage, e.g. family houses, resp. a colony of family houses, hotels, motels, smaller housing estates and so on.

BACKGROUND OF THE INVENTION

Various systems for biological purification of the biofilter and biodisk type have been used to purify smaller and the smallest individual sewage sources. The purification effectiveness of such a sewage plants doesn't reach the efficiency of the systems of biological purification using activated sludge. However the use of purification with activated sludge for small and the smallest sewage plants is driving at a lot of technical obstacles. It is known, e.g., that the hydraulic load increases with the decreasing capacity of the sewage plant. The biggest hydraulic overload occurs in small domestic sewage plants for family houses, wherein e.g. draining a bath means a short-time hydraulic overload, the intensity of which is higher in order than the whole day's average load.

The irregularity of hydraulic load requires a respective enlargement of the apparatus for purification with activated sludge and hereby also increases its costs. As a consequence of it the costs for small sewage purification plants with activated sludge increase in the hitherto existing types exponentially with the decreasing capacity.

Another disadvantage of the hitherto existing types of plants with activated sludge is also the dependence of the running cost on the size of the plant. Relatively high running cost in small sewage plants are the result of higher specific consumption of electric power and claims to service, especially the transport of excess biological sludge.

These disadvantages of small sewage plants lead to an effort to connect small sewage sources with larger plants, because the running cost for larger plants is lower.

The use of individual small sewage plants is reserved just for cases, where building up a common sewerage is not well-founded in view of economical reasons.

The so called Brown-Water-Concept is economical for purification of small and the smallest individual sewage sources, according to which the purified water from the premises of kitchens, bathrooms and from house washing-machines is repeatedly used for sanitary purposes. The condition for an efficient use of Brown-Water-Concept is besides highly efficient purification of the sewage also its purification directly at the place of the rise, in order to keep the distribution costs at the lowest level. This leads to a need of small and the smallest domestic sewage plants with high claims to the quality of the purified water, of sewage plants of small sizes, easily transportable, with a simple montage and with acceptable relation of prices. Such an apparatus which would fully comply with these conditions is still missing in the market.

The aim of the invention is to create an apparatus which would effectively purify domestic sewage, namely both for little and very little quantities of sewage, which would provide in high quality purified water and would be simple and with an acceptable price.

SUMMARY OF THE INVENTION

The disadvantages of the known solutions are removed by a reactor according to the invention the main of which is that a circulation circuit between the activation space and separation space is created in the reactor, wherein the activation space is partitioned by a partition between the partition wall of the separation space and the casing of the reactor tank, and the separation space is connected with the activation space through a passage formed in the partition wall of the separation space at the bottom thereof and in front of the partition, and a suction inlet of a recirculation set is arranged in the separation space at the bottom thereof, the outlet of the recirculation set mounting in the activation space behind the partition.

It is also important for the creation of the circulation circuit in the reactor that the separation space is connected with the activation space also by means of the transferring passage with an inlet opening at least at one quarter of the height of the separation space, the transferring passage being located in front of the partition, and the outlet from the recirculation set mouths in the activation space behind the partition.

Concerning the arrangement of individual parts in the reactor it is also a contribution that the partition in the activation space is a part of the catch pit for coarse impurities, in which the recirculation set is situated.

It is significant for an efficient course of the biological processes the activation space is at least partly partitioned between the partition wall of the separation space and the casing of the reactor tank by another partition dividing an oxide zone and an anoxide zone of the activation space from each other, and the passage is formed by at least one break in the partition wall at the end of the oxide zone of the activation space.

The efficiency is also increased by the arrangement wherein the separation space is connected with the oxide zone of the activation space also by means of the transferring passage with an inlet opening and by means of the recirculation set with the anoxide zone of the activation space, the suction inlet of the recirculation set being arranged at the bottom of the separation space and its outlet being arranged in the anoxide zone or the activation space.

It is advantageous for the simplicity of the construction, for storage, transport possibilities of the reactors and parts of them that the separation space has the form of a part-of-pyramid or a part-of-cone eccentrically arranged to a part or the casing of the tank or it has the form of a pyramid or a cone.

It is advantageous for facilitating of the processes in the reactor that the separation space is provided with a flow withdrawal equipment for purified water and a flotated sludge trap is arranged in the separation space, being provided with a pressure air supply.

It is a contribution for improvement of the denitrification processes that the outlet from the recirculation set mouths in the catch pit for coarse impurities situated at the beginning of the activation space and the outlet from the catch pit mouths in the anoxid zone of the activation space.

The maintaining of small size of the reactor results also from a catch pit for coarse impurities inserted in the separation space. It is significant for separation of the denitrification process from other processes that the anoxid zone of the activation space is surrounded by its oxid zone, which is divided by the anoxid zone into two sections. The separation space is at the same time arranged in the tank concentrically, wherein the partitions bounding the anoxid zone in the activation space are plane, vertical and directed through the center of the separation space, or the separation space is bounded by two mutually parallel, upwards widening arched partition walls and by two plane faces, one of which is a part of the casing of the tank and the other face is parallel to the first face.

Considering the directing of the flow of the mixed liquor it is a contribution that the passages are formed in the partition wall with regular gaps between them.

To prevent the turbulence transfer from the activation space into the separation space at least one flow baffle is arranged in the region of the passage and is attached to the partition wall of the separation space from the side of the activation space.

It is significant for maintaining of the activated sludge in the activation space in suspension, or for getting the activated sludge in suspension in case that that the operation of the reactor have been interrupted, that a mechanical agitating equipment is arranged in the activation space, wherein this equipment consists from pivoted load-bearing wheel and from a system of cups situated on the circumference of the load-bearing wheel, and an air supply leading under the necks of the cups is arranged to one side of the load-bearing wheel and the paddle-wheel agitator is coupled with the load-bearing wheel. It is advantageous for the simplicity of the construction that the load-bearing wheel is arranged on a shaft, on which the paddle-wheel agitator is also located, while the paddle-wheel agitator is formed by a system of supports fastened on the shaft and by a system of agitating paddles arranged on the supports. Considering the effective course of the denitrification process and the possibility to interrupt the purification process it is significant that the load-bearing wheel is arranged in the oxid zone of the activation space, while the paddle-wheel agitator is arranged in the anoxid zone of the activation space, partitioned from the oxid zone.

Considering the efficiency of the mechanical agitating equipment it is a contribution that the agitating paddles of the paddle-wheel agitator lay substantially in the plane going through the axis of rotation of the load-bearing wheel and the necks of the cups are parallel to the agitating paddles. The fact that the anoxid zone of the activation space is tapering downwards to the bottom of the tank, contributes also to it.

It is significant for creating the internal circulation circuit that the sections of the oxid zone are connected with each other through the passages, while at least one aerating element is arranged always in the outlet region of one passage and in the region of the opposite outlet of another passage. Another contribution to it is the arrangement, wherein both a connecting outlet connecting the anoxid zone with the oxid zone of the activation space and an inlet of the connecting pipe connecting anoxid zone of the activation space with the catch pit for coarse impurities are formed in one of the partitions bounding the anoxid zone of the activation space.

To maintain the necessary quantity of activated sludge in the reactor a sludge discharge tube for removal of excess activated sludge mouths in the activation space and its inlet is situated at one third to two thirds of the reactor height above the bottom of the reactor.

An advantage of present apparatus according to the invention is its small size and a compact and closed construction permitting a large-scale production of easily transportable reactors. An advantage is also easy location of the apparatus in the basement of residential houses.

Investment and operation costs for sewage purification with drinking water savings in the Brown-Water-Concept come close to the costs for sewage purification in big centralized sewage plants, and so the reasons fall which have led to uniting of smaller sewage sources in bigger units with the necessity to build expensive sewerage networks.

BRIEF DESCRIPTION OF THE DRAWINGS

The invention will now be described in more detail with reference to the accompanying drawings, wherein.

All identical elements or similar elements for identical purpose are marked with the same sign.

EXEMPLIFYING EMBODIMENTS OF THE INVENTION

EXAMPLE 1

Figure 1:
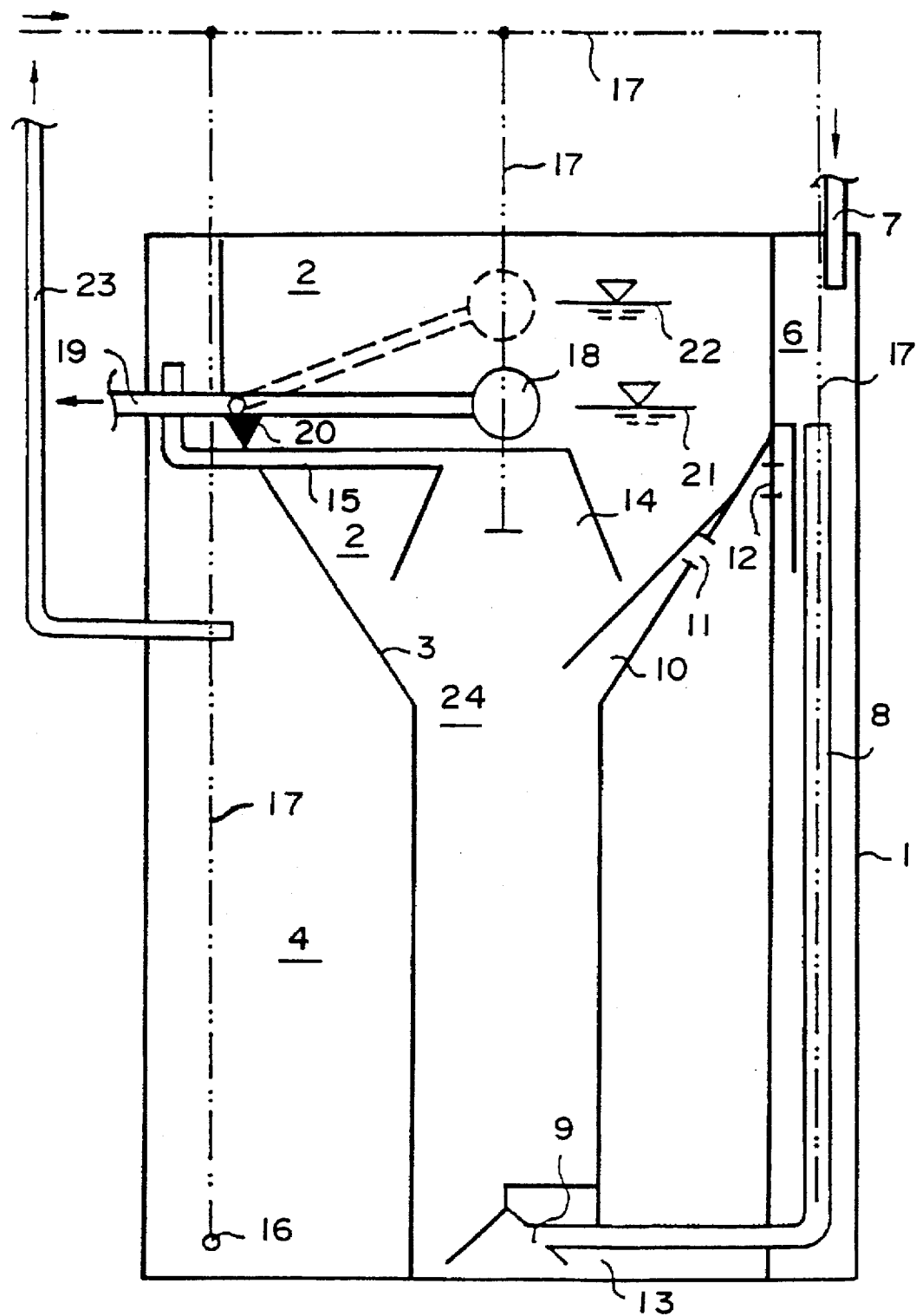
FIG. 1 shows a schematic vertical axial section of the apparatus and FIG. 2 shows schematic ground plan of the apparatus according to Example 1, FIG. 3 a schematic ground plan, FIG. 4 schematically shown section A—A indicated in FIG. 3

There is a separation space 2 concentrically situated in the tank with the casing 1, which is preferably of a cylindrical form, said separation space 2 is bounded by the wall 3, the upper part of which has preferably the form of a conical casing and its lower part has a form of a cylindrical casing. The casing 1 of the tank may also have the form of a polygon, e.g. of a square. Also the upper part of the separation space 2 in the section may have the form of a square or other polygon, but it has always the form of a funnel. In accordance with the form of the upper part of the separation space 2 the lower part has got a corresponding cylindrical or polygonal form.

The separation space is intended for separation of the sludge through fluidized bed filtration. A circumferencial activation space 4 is created between the casing 1 of the tank and the wall 3 of the separation space 2, wherein said activation space 4 is in one place partitioned by a partition 5, which is vertical according to the exemplifying embodiment. The partition 5 forms preferably a part of the catch pit 6 for coarse impurities, into which admission 7 of the raw sewage mouths. There is a recirculation set 8 inserted in the catch pit 6, which is formed e.g. by an air-lift pump, the suction inlet 9 of which is led to the bottom of the separation space. The interconnection between the activation space 4 and separation space 2 is formed by the transferring passage 10 with the inlet opening 11. The transferring passage 10 is situated near to the partition 5 and in the direction of flow of the mixed liquor in front of the partition 5. Outlet 12 from the catch pit 6 for coarse impurities mouths in the activation space 4 in the direction of flow of the mixed liquor behind the partition 5.

A passage 13 is formed in the wall 3 of the separation space 2 at its bottom in front of the partition 5 on the side of the transferring passage 10, while by means of the passage 13 the separation space 2 communicates with the activation space 4. The upper part of the separation space has the form of a funnel (FIG. 1) and the lower, cylindrical part is connected with it. The boundary between them is formed by the inlet passage 24. The optimum size of the area of the inlet passage 24 is at least 10% of the separation surface in the level. There is a flotating sludge trap 14 arranged in the upper flaring part of the separation space 2, said trap 14 having an outlet 15 for flotated sludge, which mouths in the activation space 4. An inlet for air from pressure air supply (not shown) mouths in the flotating sludge trap 14, which is consequently aerated. That pressure air supply serves also for pneumatic aerating system in the reactor consisting first of all of aerating elements 16 connected with said pressure air supply through a distributing main 17. The distributing main 17 is intended also for admission of air in the flotating sludge trap 14 and in the recirculation set 8 represented by an air-lift pump. The aerating elements 16 are arranged in the activation space preferably with a different gap and consequently different parts of the circumferencial activation space have different intensity of aerating.

A floating withdrawal equipment 18 for purified water with an outlet 19 is situated at the level surface of the separation space 2. The lowest position of the float withdrawal equipment 18 is determined by a stop 20 and a spillway (not shown) of the floating withdrawal equipment 18 is set up at a certain maximal withdrawal, not exceeding the double of the whole day average hydraulic load of the reactor.

The level 21 of the reactor is under an average load of the reactor in the lowest position and it rises under a short-time hydraulic overload and it may increase up to the highest level 22 (FIG. 1). Fluctuations of water table is performed in the cylindrical part of the separation space 2, so that the wall 3 of the separation space 2 is always under the level surface. Sludge discharge tube 23 is led into the activation space 4 (FIG. 1) and its outlet is preferably located in the upper half of the activation space 4.

The function of the apparatus for biological sewage purification is as follows:

Raw sewage flows through the admission 7 into the catch pit 6 for coarse impurities. The flow of the mixed liquor and air in catch pit 6 for coarse impurities from the recirculation set 8 represented by an air-lift pump accelerates the disintegration of paper from the sanitary apparatus and separates coarse depositable impurities in the sewage in the lower part of the catch pit 6. The partition 5 partitioning the circumferencial activation space 4 is preferably used as a part of the catch pit 6. The mixed liquor is led out from the catch pit 6 into the activation space through the outlet 12. The mixed liquor in which raw sewage is admixed flows in the circumferencial activation space by a plug flow. By admixing the raw sewage in the mixed liquor and because of low intensity of aerating in the beginning of the plug flow in the activation space 4 as a result of absence of the aerating elements or big gap between them in this part of the activation space 4 causes an oxygen shortage at the surface of the activated sludge particles, and this induces denitrification processes, wherein the biocenosis microorganisms in the activated sludge get the oxygen for their life processes from the nitrates contained in the sewage.

The mixed liquor with the admixed sewage is oxidized then in the next part of the circumferencial activation space 4 continuously by a pneumatic aeration, which at the same time secures suspension of the activated sludge in the whole activation space 4.

The mixed liquor is oxidized gradually until it reaches the conditions suitable for nitrification processes, which requires a concentration of the dissolved oxygen in the mixed liquor exceeding 2 mg $O_2$/l, and then the mixed liquor is put to fluidized bed filtration.

The mixed liquor flows in the separation space 2 for fluidized bed filtration through the inlet opening 11 and through transferring passage 10. The efficiency of the separation through the fluidized bed filtration depends apart from other things on the size of the inlet passage 24, through which the mixed liquor passes on in the upper part of the separation space 2. The purified water is separated from the activated sludge in the fluidized bed filter in the separation space 2 by fluidized bed filtration and it is taken away by means of the floating withdrawal equipment 18, which is in the lowest position fixed by the stop 20. The floating withdrawal equipment 18 makes a removal of at the very most the double of average whole day sewage inflow possible. During an intermittent, short-time hydraulic overload which occurs with a draining of a bathtub may the level in the reactor rise up to the highest level 22. The difference between the minimal level 21 and the highest level 22 represents the retention for taking up the short-time hydraulic overload.

During the gradual filling of this retention the level 21 rises slowly in the whole reactor, without increasing the rate of flow through the fluidized bed filter over the maximum limit for the rate of flow, e.g. over the double of the average whole day rate of flow, whereby a failure of the fluidized bed filter and a leakage of the activated sludge in the purified water is prevented. This regulation of maximum purified water withdrawal cuts the claims for intensity of the separation and secures a high efficiency of the fluidized bed filtration also during short-time extreme hydraulic overload.

The activated sludge after the withdrawal of the purified water falls countercurrent-wise through the inlet passage 24 into the cylindrical lower part of the separation space 2, where the suction inlet 9 of the recirculation set 8 mouths. The lower part of the separation space 2 communicates at its bottom with the passage 13 situated in front of the partition 5.

The passage 13 makes it possible that the activated sludge passes through from the separation space 2 into the circumferencial activation space 4 in case the aerating of the reactor is suspended, and this prevents sludge silting in the separation space 2. The passage 13 secures also equalizing of the levels in the separation and activation during the reactor filling, or during its draining, or sludge removal, and this makes a pressureless solution of the sunk constructions of the reactor possible.

The flotating sludge in the fluidized bed filter in the separation space is trapped in the sludge trap 14. The trapped flotated sludge is taken away from the sludge trap 14 through the outlet 15 into the circumferencial activation space 4, namely by an air-lift pump bringing pressure air in the sludge trap 14.

The excess activated sludge withdrawal is performed periodically by a car for feces disposal. To withdraw the excess activated sludge the sludge discharge tube 23 is provided, which mouths in the activation space, namely in the upper half of the reactor height. The excess sludge is removed in operation of the reactor by drawing off part of the mixed liquor in the car for feces disposal.

The mixed liquor is pumped by the recirculation set 8 into the catch pit 6 for coarse impurities, wherefrom it flows through the outlet 12 into the circumferencial activation space 4 behind the partition 5. So the inner circulation circuit is created, through which the mixed liquor flows by a plug flow. Raw sewage is admixed in the catch pit 6 after removal of purified water in the fluidized bed filter, it causes—as mentioned above—sudden drop of the dissolved oxygen in the mixed liquor, especially at the surface of the activated sludge particles, and so the conditions for dynamic denitrification are provided. The narrow channel shape of the activation space 4 makes it possible that also a low aerating intensity is in the beginning of the circulation flow with a relatively high rate of flow sufficient to secure suspension of the activated sludge. Herewith the denitrification regime in this part of the activation space 4 is not disrupted, which requires a low content of dissolved oxygen in the mixed liquor. During continuous intense aerating of the mixed liquor with admixed raw sewage in the next part of the plug flow a contaminant degradation and a gradual saturation of the mixed liquor with oxygen content up to 2 mg $O_2/l$ occur, and so the conditions for nitrification of nitrogen compounds are created.

The increased content of the dissolved oxygen influences favorably also the intensity of the following separation of the activated sludge through fluidized bed filtration, because the higher content of the dissolved oxygen in the mixed liquor prevents postdenitrification processes during fluidized bed filtration.

The mixed liquor is after termination of the oxidizing purification processes subjected to the separation of the activated sludge suspension through fluidized bed filtration in the separation space 2. The circulating mixed liquor brings to the circulation circuit zone at its beginning—with a lowered content of the dissolved oxygen—nitrates arisen in the nitrification zone with sufficient oxygen content. The nitrates are reduced to gaseous oxygen in this zone with a lowered oxygen content.

The total intensity of the biological purification processes depends on the concentration of the activated sludge in the purification system, which is directly dependent on the separation efficiency. Integrating the fluidized bed filtration into the circulation circuit of the mixed liquor using surface of activation for separation provides a high concentration of the activated sludge, which afterwards causes a low load of the sludge, necessary to keep the nitrification running as the main condition for high intensity of the purification processes.

Through the described purification process all processes of complex biological purification with removal of organic and nitrogen compound and also with a highly efficient removal of the phosphates from the sewage are realized during only one circulation in the circulation circuit. The quality of the purified water gives a new possibilities, e.g. a new use of it for sanitary purposes in the Brown-Water-Concept system or its direct draining by means of sewer pipes in the soil, without endangering the quality of subterranean water.

EXAMPLE 2

Figure 3:
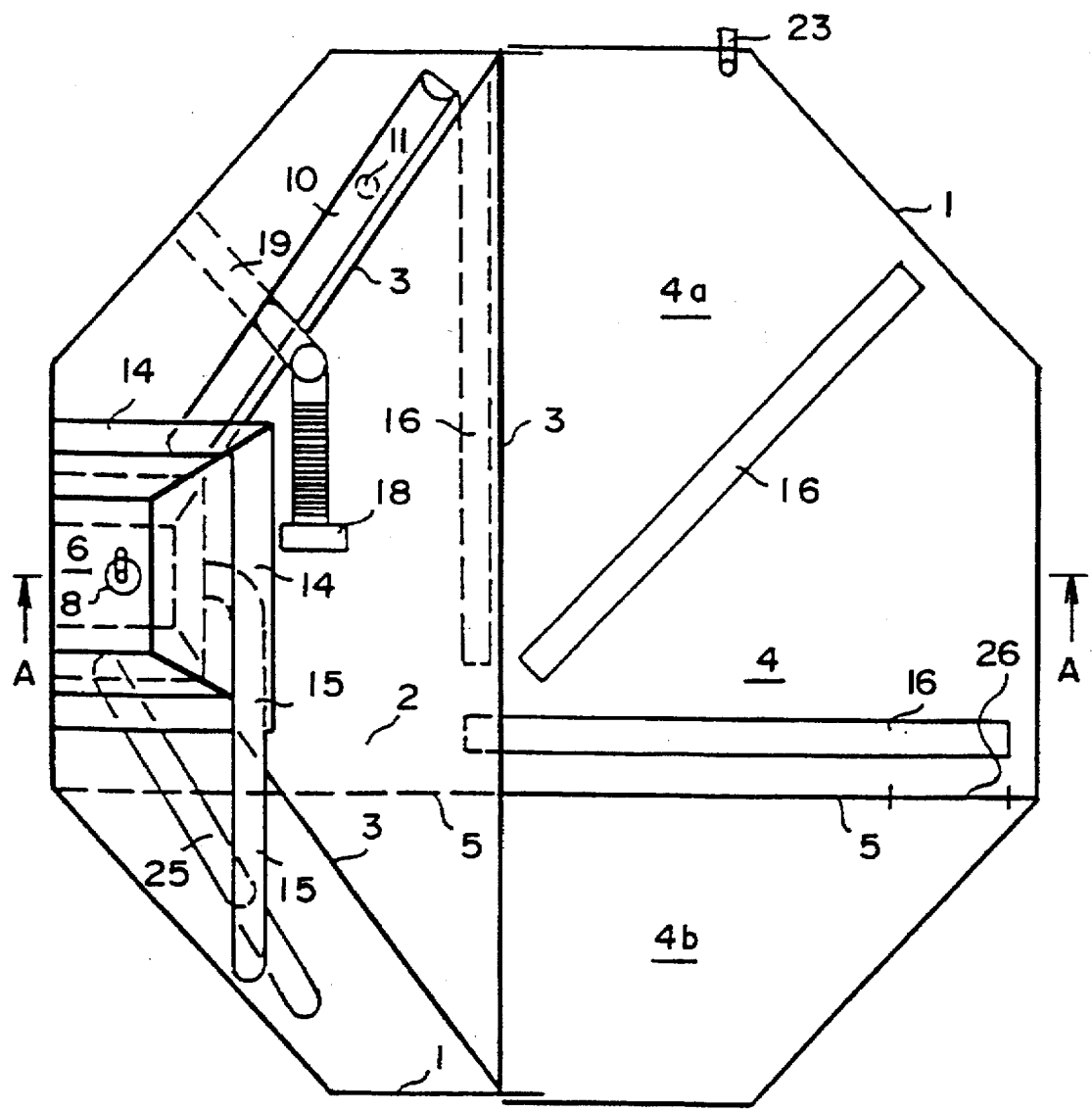
Figure 4:
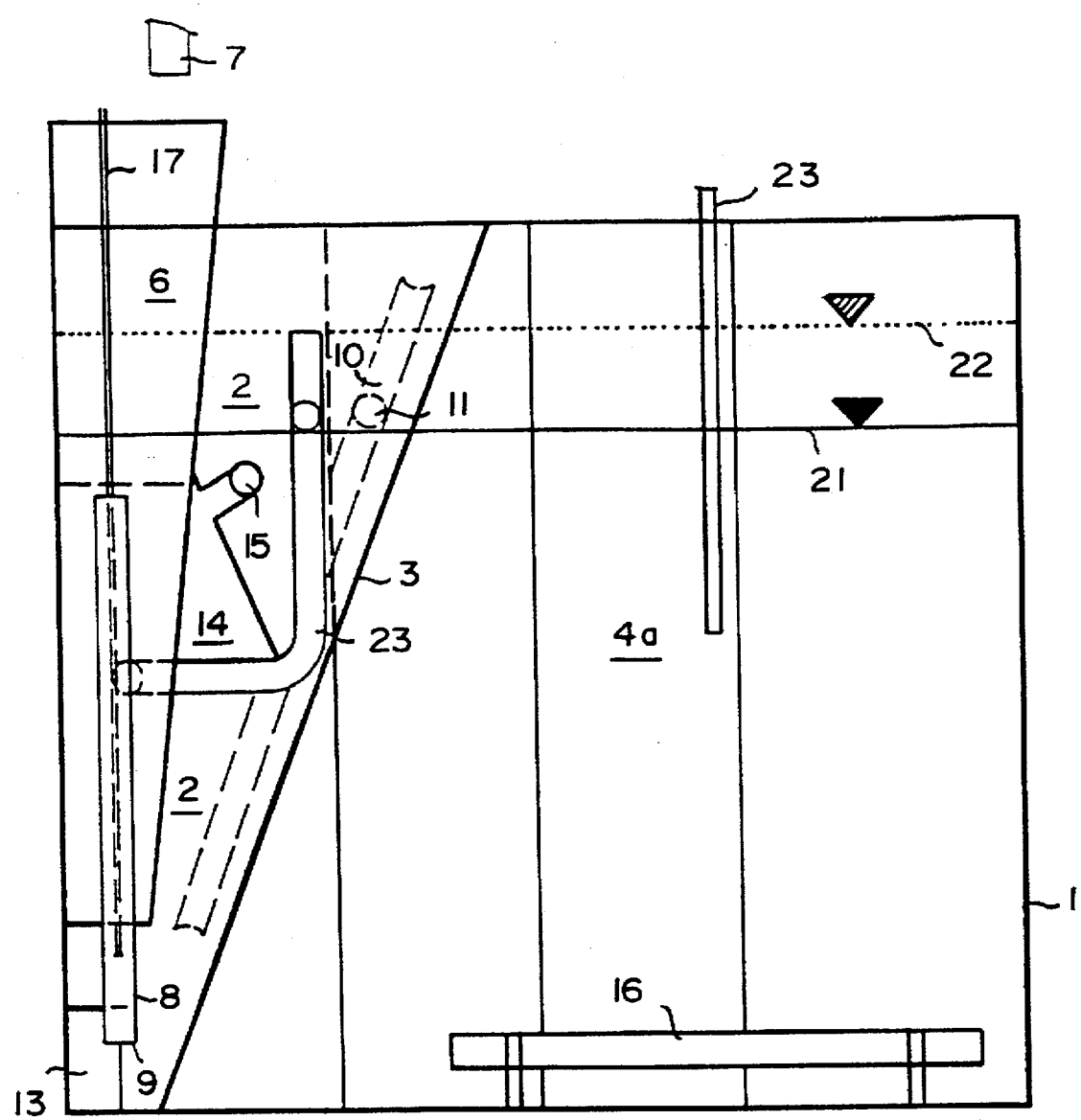
Figure 5:
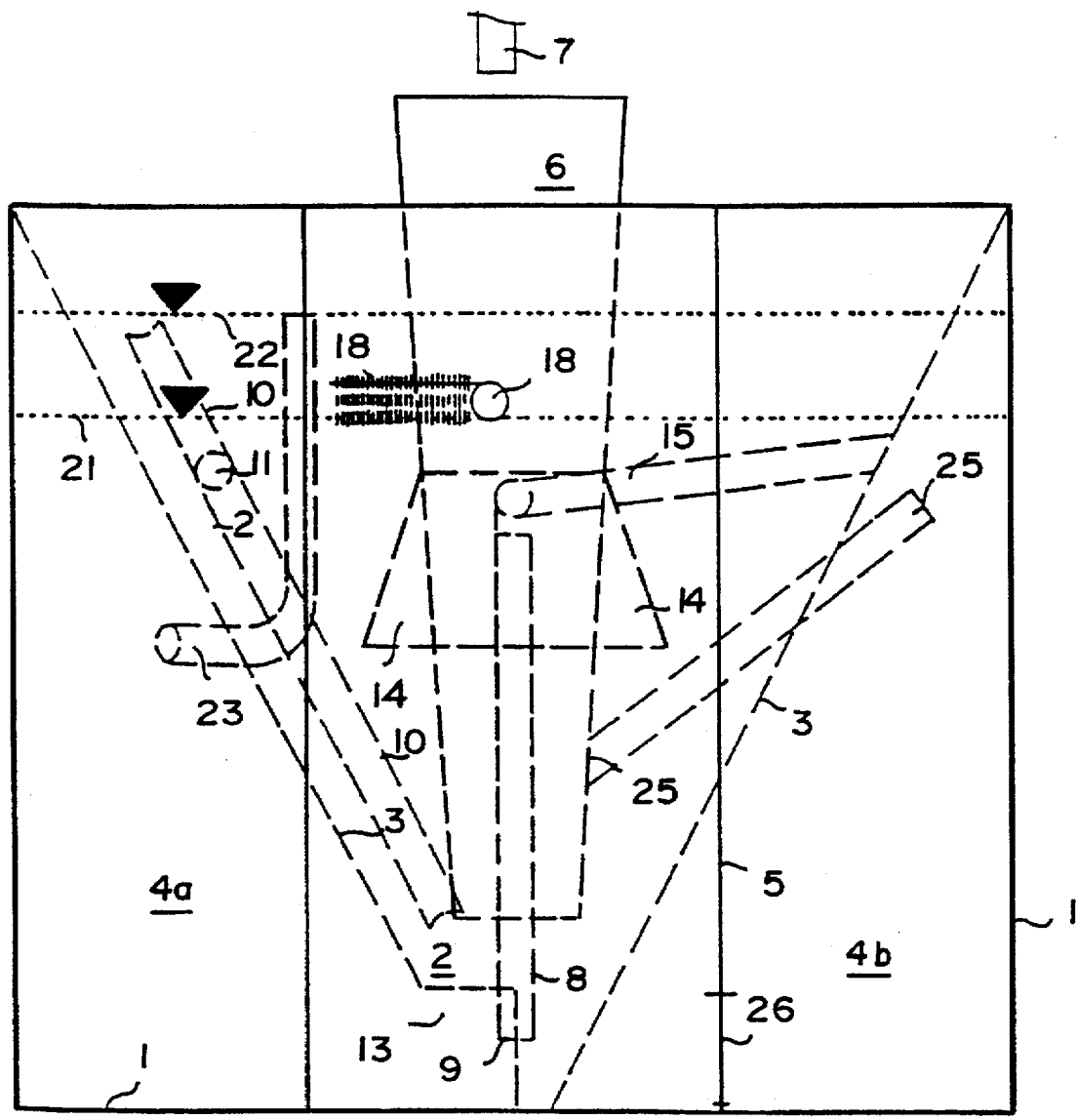
FIG. 5 shows a schematic side view of the apparatus according to Example 2, FIG. 6 schematic front view section and FIG. 7 schematic ground plan of the apparatus according to Example 3, FIG. 8 schematic ground plan, FIG. 9 schematically shown section A—A indicated in FIG. 8 and FIG. 10 schematic side view of the apparatus according to Example 4, FIG. 11 schematic front view and FIG. 12 schematic ground plan of the apparatus according to Example 5, FIG. 13 schematic front view and FIG. 14 schematic ground plan of the apparatus according to Example 6.

The separation space 2 for separation through fluidized bed filtration arranged to a part of the casing 1 of the tank is eccentrically situated in the tank with the casing 1, the tank having the form of a polygon (FIGS. 3 to 5). The separation space 2 is bounded both by a vertical wall of a part of the casing 1 and by oblique partition walls 3, which form the funneling downwards tapering separation space 2.

The separation space 2 has preferably the form of a part-of-pyramid or part-of-cone arranged eccentrically to a part of the tank casing 1. There is a catch pit 6 for coarse impurities arranged to the casing 1 in the separation space 2, and the admission 7 for sewage mouths in the catch pit 6.

A recirculation set 8 is located in the catch pit 6 (FIG. 4), which is represented e.g. by an air-lift pump, the suction inlet 9 of which mouths at the bottom of the separation space 2. The activation space 4 is formed between the tank casing 1 and the wall 3 of the separation space 2 and it is partitioned by a partition 5 (FIG. 3), which separates together the partition wall 3 of the separation space 2 at least partially the oxid zone 4a of the activation space 4 from the anoxid zone 4b of the activation space 4. The oxid zone 4a and the anoxid zone 4b are mutually connected, e.g. through a connecting opening 26 formed in the partition 5 at the bottom of the tank (FIGS. 3, 5). An interconnection between the activation space 4 and the separation space 2 is formed by a transferring passage 10 with an inlet opening 11 (FIG. 3). A passage 13 is formed in the partition wall 3 of the separation space 2 near to its bottom, at the side of the transferring passage 10 and the separation space 2 communicates with the oxid zone 4a of the activation space 4 through the passage 13 (FIG. 4).

A flotating sludge trap 14 with an outlet 15 for flotated sludge is located in the upper widening part of the separation space 2 and it mouths in the anoxid zone 4b of the activation space 4.

An admission for air from a pressure air supply (not shown) mouths in the flotating sludge trap 14. Said pressure air supply is preferably intended also for pneumatic aerating system in the reactor, consisting from aerating elements 16 connected with a pressure air supply (not shown) through a distribution main (also not shown). The pressure air from the same supply may also be used for recirculation set 8 represented by an air-lift pump.

An activated sludge suspension in the anoxid zone 4b of the activation space 4 is secured through the described arrangement for flowing-in of the sewage in the activation space 4 and flowing-off out of it and through aerating with a small quantity of air from the common pressure air supply (not shown). The quantity of air is at the same time chosen so that it is enough for activated sludge suspension, but it doesn't disturb essentially the anoxid conditions in the anoxid zone 4b of the activation space 4 necessary for running of the denitrification processes. To this purpose is this part of activation provided with one or more spot aerating elements (not shown). A floating withdrawal equipment 18 for removal of the purified water with an outlet 19 is located on the level of the separation space 2 (FIGS. 3, 5). The lowest position of the floating withdrawal equipment 18 is set by a stop (not shown) and the spillway (not shown) of the floating withdrawal equipment 18 is set at a certain maximum withdrawal not exceeding the double of the average whole day hydraulic load of the reactor.

The level 21 of the reactor is in the lowest position during an average load of the reactor and during a short-time hydraulic overload it rises and it may reach the highest level 22 (FIGS. 4, 5). The apparatus is provided with a sludge discharge tube 23 for removal of excess sludge (FIG. 4), which preferably mouths in the upper part of the activation space 4.

The oxid zone 4a and the anoxid zone 4b of the activation space 4 are mutually connected through a connecting opening 26 in the partition 5, preferably at the bottom of the tank.

The described reactor consists preferably from two sector parts (FIG. 3). In one part—in FIG. 3 left—are concentrated technological constructions forming individual function elements. Another part serving as activation space 4 is arranged to it. Said embodiment makes the mutual putting-in of both parts one into another, which is advantageous especially for storage and transport.

The function of the described apparatus for biological sewage purification is similar to the the function of the apparatus in Example 1, so much it is not described in so detail:

The sewage flows through the admission 7 into the catch pit 6 for coarse impurities. The mixed liquor from the catch pit 6 is led in the anoxid zone 4b of the activation space 4 through the outlet 25. The activated sludge suspension in the anoxid zone 4b of the activation space 4 is maintained through a small aeration intensity. At a small aeration intensity in the anoxid zone 4b of the activation space 4 arises a lack of dissolved oxygen, which causes denitrification processes.

The mixed liquor after denitrification flows through the connecting opening 26 (FIG. 3) formed in the partition 5 at the bottom of the tank into the oxid zone 4a of the activation space 4, wherein intense aeration by aerating elements 16 creates an oxid environment, in which then the aerobe processes of water purification take place, incl. nitrification of the ammoniacal and organic nitrogen. The mixed liquor is after oxid activation process submitted to the fluidized bed filtration.

The mixed liquor runs into the separation space 2 for fluidized bed filtration through the inlet opening and through the transferring passage 10 (FIG. 3), where in the fluidized bed filter in the separation space 2 the activated sludge is separated from the purified water through fluidized bed filtration.

The passage 13 makes it possible that in case of a suspending of the reactor aeration the activated sludge may penetrate from the separation space into the activation space 4. The passage secures also the equalizing of the levels in the separation and in the activation during the reactor filling or draining, resp. during the sludge removal. It also makes an additional suction of the mixed liquor directly from the oxid zone 4a of the activation space 4 possible.

The removal of the excess sludge is performed periodically by its transport by a car for feces disposal, in which it is withdrawn through the sludge discharge tube 23.

EXAMPLE 3

Figure 6:
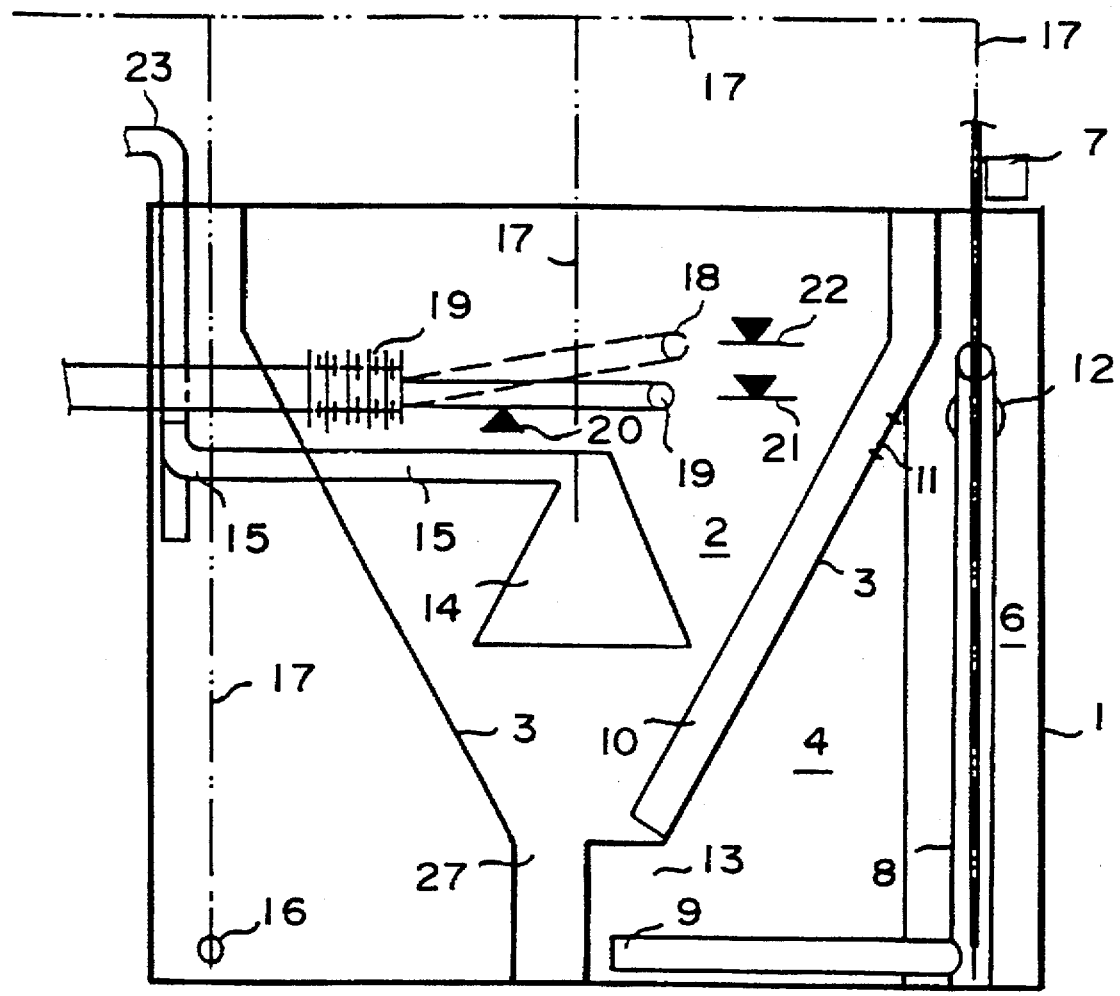
Figure 7:
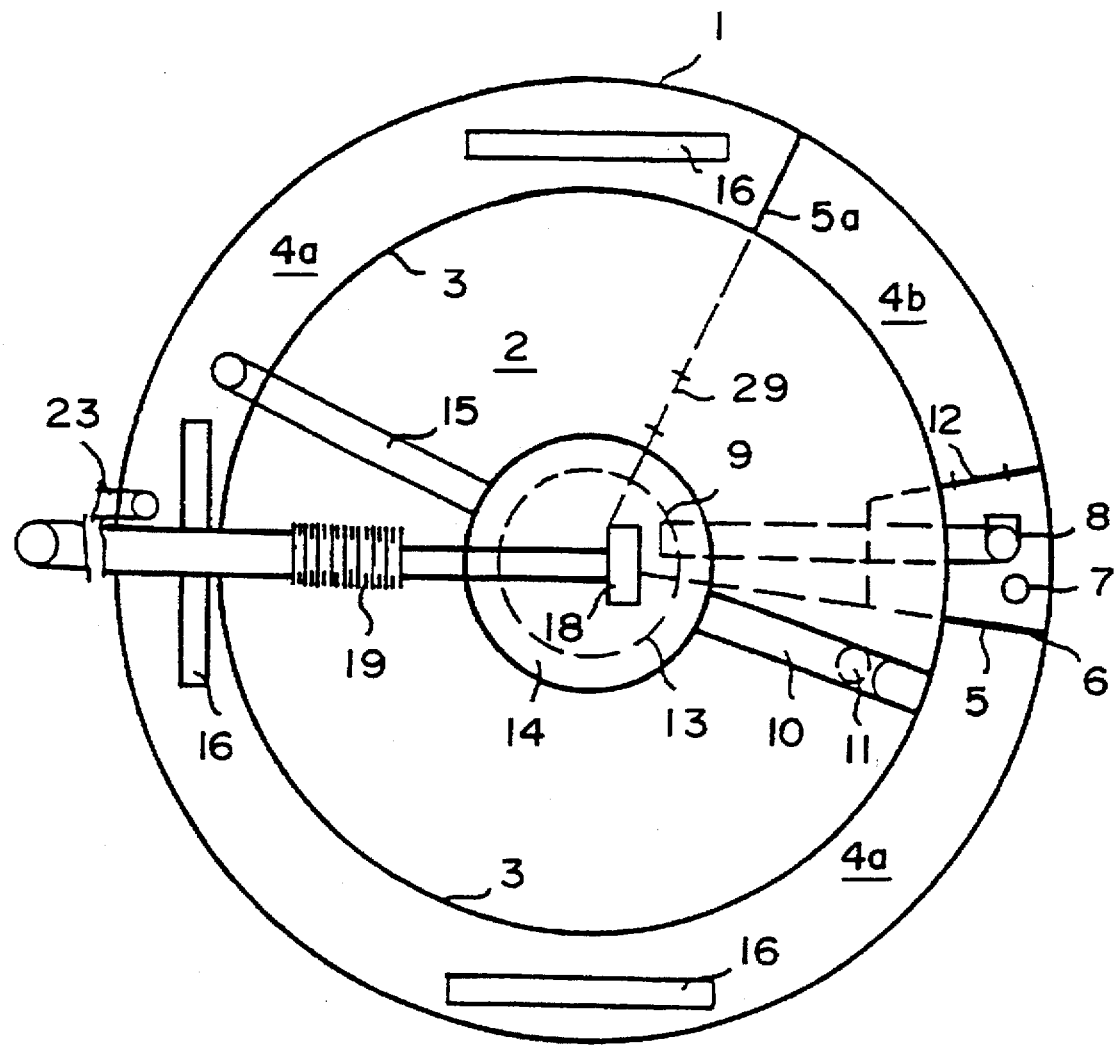

The separation space 2 bounded by the wall 3 having the form of a conical casing or a pyramid is located in the tank having the casing 1 of a preferably cylindrical form (FIGS. 6, 7). The separation space 2 is essentially concentric with the tank, but it is also possible to locate the separation space 2 eccentric. In accordance with this funneling shape of the upper part of the separation space 2 its lower part has a corresponding cylindrical or prismatic form.

The separation space 2 is intended for separation of the sludge through fluidized bed filtration. A circumferencial activation space 4 is created between the casing 1 of the tank and the wall 3 of the separation space 2, wherein said activation space 4 is in one place partitioned by a partition 5, which is vertical according to the exemplifying embodiment. The partition 5 forms preferably a part of the catch pit 6 for coarse impurities, in which admission 7 of the raw sewage mouths. There is a recirculation set 8 inserted in the catch pit 6, which is formed e.g. by an air-lift pump, the suction inlet 9 of which is led to the bottom of the separation space. The interconnection between the activation space 4 and separation space 2 is formed by the transferring passage 10 with the inlet opening 11. The transferring passage 10 is situated at the partition 5 and in the direction of flow of the mixed liquor in front of the partition 5. Outlet 12 from the catch pit 6 for coarse impurities mouths in the activation space 4 in the direction of flow of the mixed liquor behind the partition 5.

A passage 13 is formed in the wall 3 of the separation space 2 at the bottom in front of the partition 5 on the side of the transferring passage 10, wherein by means of the passage 13 the separation space 2 communicates with the activation space 4. The boundary between the upper part and the lower part of the separation space is formed by the inlet passage 27. There is the floating sludge trap 14 arranged in the upper flaring part of the separation space 2, said trap 14 having an outlet 15 for flotated sludge, which mouths in the activation space 4. An inlet for air from pressure air supply (not shown) mouths in the floating sludge trap 14, which is consequently aerated. That pressure air supply serves also for pneumatic aerating system in the reactor consisting first of all of aerating elements 16 connected with said pressure air supply through a distributing main 17. The distributing main 17 is intended also for admission of air in the floating sludge trap 14 and in the recirculation set 8 represented by an air-lift pump. The aerating elements 16 are arranged in the activation space preferably with a different gap and consequently different parts of the circumferencial activation space have different intensity of aerating.

It is also advantageous to include another dividing element, e.g. a partition wall 5a, which partitions off the activation space and together with the partition 5 entirely divides the activation space into oxid zone 4a of the activation space 4 and the anoxid zone 4b of the activation space 4. Spot aerating supplies (not shown) are situated in the anoxid zone 4b of the activation space 4, wherein the inlet in this space is performed in the upper part of the anoxid zone 4b by the outlet 12 from the catch pit 6 and the draining is formed by the connecting opening 29 in the partition wall 5a at the bottom of the tank.

A floating withdrawal equipment 18 for purified water with an outlet 19 is situated at the level surface of the separation space 2. The lowest position of the float withdrawal equipment 18 is determined by a stop 20 and a spillway (not shown) of the floating withdrawal equipment 18 is set up at a certain maximal withdrawal, in a similar way as in the Example 1 not exceeding the double of the whole day average hydraulic load of the reactor.

The level 21 of the reactor is under an average load of the reactor in the lowest position and it rises under a short-time hydraulic overload and it may increase up to the highest level 22 (FIG. 6). Fluctuations of water table is performed in the upper, preferably cylindrical part of the separation space 2, so that the wall 3 of the separation space 2 is always under the level surface. Sludge discharge tube 23 is led into the activation space 4 (FIG. 6) and its outlet is preferably located in the upper half of the activation space 4.

From the preceding description of the Examples follow especially these common fundamental features:

A circulation circuit is formed in the reactor between the activation space 4 and the separation space 2. The separation space 2 communicates with the activation space 4 both through the transferring passage 10 with the inlet opening 11 and the passage 13 and through the recirculation set 8, the suction inlet 9 of which is led to the bottom of the separation space and the outlet in the activation space 4. The activation space 4 is at least partially partitioned by a partition 5 between the wall 3 of the separation space 2 for fluidized bed filtration and the casing 1 of the reactor tank. Said partition 5 separates essentially the oxid zone 4a and the anoxid zone 4b of the activation space 4 from each other. The separation space 2 for fluidized bed filtration is provided with a floating withdrawal equipment 18 for purified water. The flotating sludge trap 14 in the separation space 2 for fluidized bed filtration is provided with a pressure air supply. A sludge discharge tube 23 for removal of excess activated sludge mouths in the activation space and its inlet is situated in one to two thirds reactor height over the tank bottom.

The function of the apparatus according to the Example 3 is analogous to the function according to the Example 2:

Raw sewage flows in a similar way as in the preceding Examples through the admission 7 into the catch pit 6 for coarse impurities. The partition 5 partitioning the circumferencial activation space 4 is preferably used as a part of the catch pit 6. The mixed liquor is led out from the catch pit 6 into the activation space through the outlet 12. The mixed liquor in which raw sewage is admixed flows in the circumferencial activation space by a plug flow. By admixing the raw sewage in the mixed liquor and because of low intensity of aerating in the beginning of the plug flow in the activation space 4 as a result of absence of the aerating elements or big gap between them in this part of the activation space 4 causes an oxygen shortage at the surface of the activated sludge particles, and this induces denitrification processes. This part of the activation space 4 functions similarly like the anoxid zone 4b of the activation space 4 according to the Example 2.

The mixed liquor with the admixed sewage is oxidized then in the next part of the conferencial activation space 4 continuously by a pneumatic aeration, which at the same time secures suspension of the activated sludge in the whole activation space 4.

If the partition wall 5a is used as another dividing element, the creation of the anoxid environment in the anoxid zone 4b of the activation space 4 is raised. The activated sludge suspension is secured in the anoxid zone 4b by a vertical flow and partial aerating from spot aeration supplies.

The mixed liquor is oxidized gradually until it reaches the conditions suitable for nitrification processes, which requires a concentration of the dissolved oxygen in the mixed liquor exceeding 2 mg $O_2$/l, and then the mixed liquor is put to fluidized bed filtration.

The mixed liquor flows in the separation space 2 for fluidized bed filtration through the inlet opening and through transferring passage 10. The efficiency of the separation through the fluidized bed filtration depends apart from other things on the size of the inlet passage 27, through which the mixed liquor passes on in the upper part of the separation space 2. The purified water is separated from the activated sludge in the fluidized bed filter in the separation space 2 by fluidized bed filtration and it is taken away by means of the floating withdrawal equipment 18, the function of which is similar to the the function of the floating withdrawal equipment 18 according to the preceding Examples.

The activated sludge after the withdrawal of the purified water falls countercurrent-wise through the inlet passage 27 into the lower part of the separation space 2, where the suction inlet 9 of the recirculation set 8 mouths. The lower part of the separation space 2 communicates at the bottom with the passage 13 situated in front of the partition 5.

The passage 13 makes it possible that the activated sludge passes through from the separation space 2 into the circumferencial activation space 4 in case the aerating of the reactor is suspended, and this prevents sludge silting in the separation space 2. The passage 13 secures also equalizing of the levels in the separation and activation during the reactor filling, or during its draining, or sludge removal, and this makes a pressureless solution of the sunk constructions of the reactor possible.

The flotating sludge in the fluidized bed filter in the separation space is trapped in the sludge trap 14. The trapped flotated sludge is taken away from the sludge trap 14 through the outlet 15 into the circumferencial activation space 4, namely by an air-lift effect bringing pressure air in the sludge trap 14. The excess activated sludge withdrawal is performed periodically by a car for feces disposal with the reactor working.

The mixed liquor is pumped by the recirculation set 8 into the catch pit 6 for coarse impurities, wherefrom it flows through the outlet 12 into the circumferencial activation space 4 behind the partition 5. So the inner circulation circuit is created, through which the mixed liquor flows by a plug flow. Raw sewage is admixed in the catch pit 6 after removal of purified water in the fluidized bed filter, it causes—as mentioned above—sudden drop of the dissolved oxygen content in the mixed liquor, especially at the surface of the activated sludge particles, and so the conditions for dynamic denitrification are provided. The narrow channel shape of the activation space 4 makes it possible that also a low aeration intensity is at the beginning of the circulation flow with a relatively high rate of flow sufficient to secure suspension of the activated sludge. Herewith the denitrification regime in this part of the activation space 4 is not disrupted, which requires a low content of dissolved oxygen in the mixed liquor.

During continuous intensive aerating of the mixed liquor with admixed raw sewage in the next part of the plug flow a degradation of organic impurities through oxidation occurs. If the activation space 4 is fully divided by the partition wall 5a said degradation occurs in the oxid zone 4a of the activation space 4.

The increased content of the dissolved oxygen influences favorably also the intensity of the following separation of the activated sludge through fluidized bed filtration, because the higher content of the dissolved oxygen in the mixed liquor prevents postdenitrification processes during fluidized bed filtration.

The mixed liquor is after termination of the oxidizing purification processes subjected to the separation of the activated sludge suspension through fluidized bed filtration in the separation space 2. The circulating mixed liquor brings to the circulation circuit zone at its beginning—with a lowered content of the dissolved oxygen—nitrates arisen in the nitrification zone with sufficient oxygen content. The nitrates are reduced to gaseous oxygen in this zone with a lowered oxygen content.

EXAMPLE 4

The tank of the apparatus is formed by the casing 1 and the bottom. According to this exemplifying embodiment the casing 1 has the form of a polygon, but another form, e.g. a cylindrical form may also be suitable. The separation space 2 for separation through fluidized bed filtration is placed eccentrically in the tank and it is arranged to a part of the casing 1 (FIG. 9), so that one wall of the separation space 2 is formed directly by the casing 1 of the tank. The separation space 2 is bounded both by a vertical wall of a part of the casing 1 and by oblique partition walls 3, which form the funneling downwards tapering separation space 2.

The separation space 2 has preferably the form of a part-of-pyramid or part-of-cone arranged eccentrically to a part of the tank casing 1. There is a catch pit 6 for coarse impurities arranged to the casing 1 in the separation space 2, and the admission 7 for sewage mouths in the catch pit 6.

Figure 8:
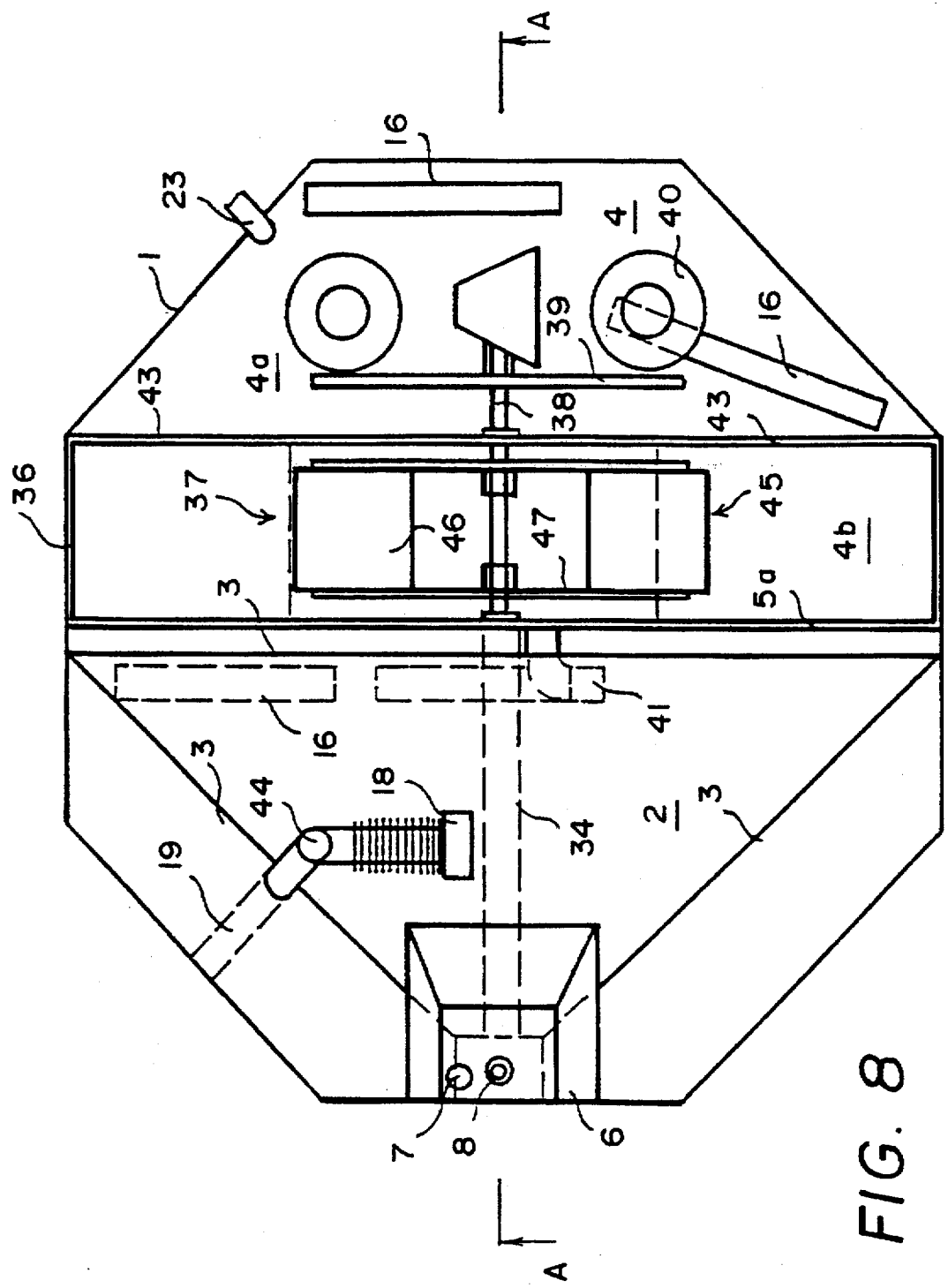
Figure 9:
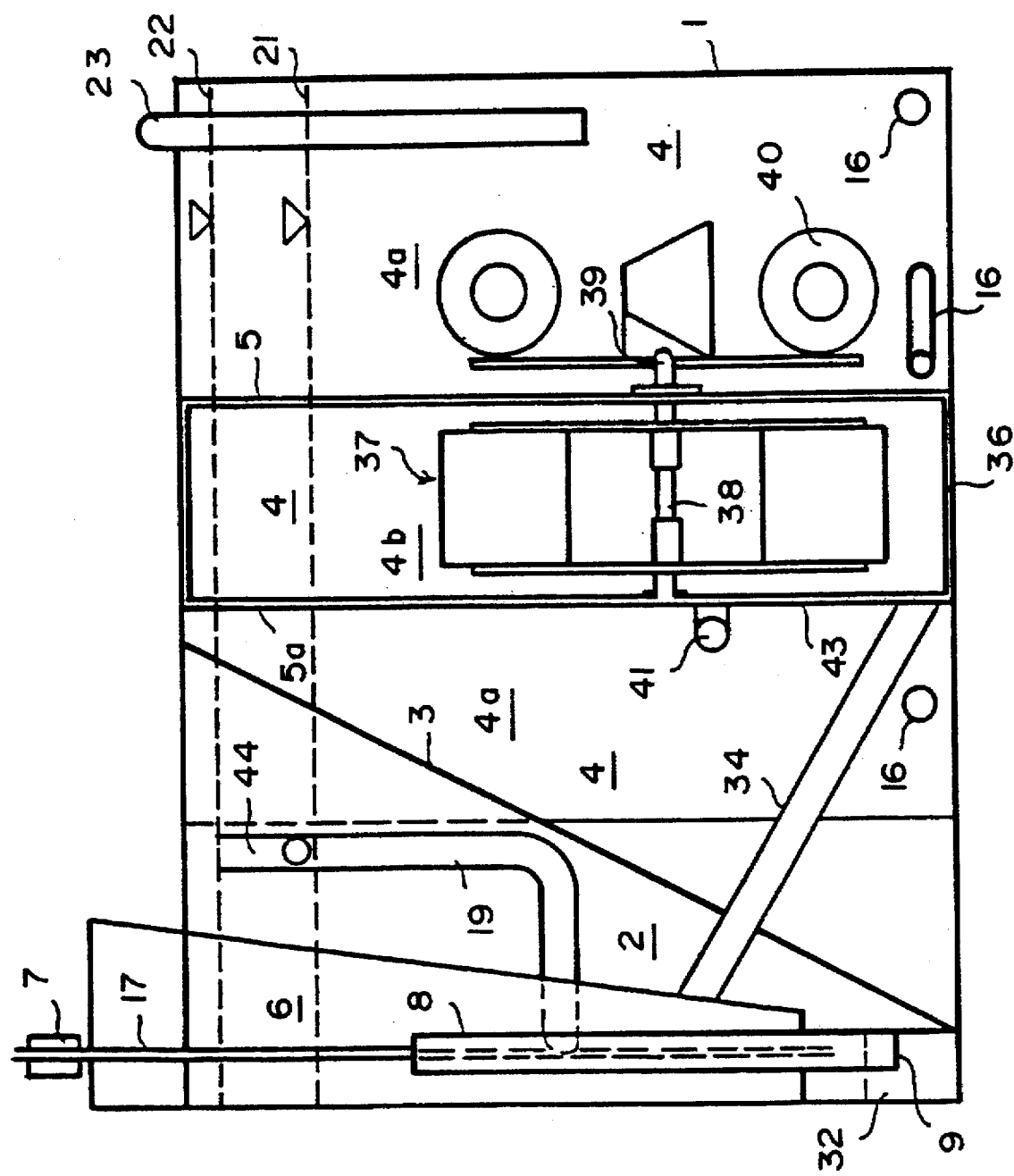

A recirculation set 8 is located in the catch pit 6 (FIG. 9), which is represented e.g. by an air-lift pump, the suction inlet 9 of which is situated near to the bottom of the separation space 2 and the outlet of the recirculation set 8 is led in the catch pit 6. The activation space 4 is formed between the separation space 2 and the casing 1, or precisely between the wall 3 of the separation space 2 and the tank casing 1. The activation space 4 is divided into oxid zone 4a and anoxid zone 4b. This is performed e.g. so that the anoxid zone 4b is inserted in the activation space 4 (FIGS. 8, 9). The anoxid zone 4b has at the same time its own construction formed by the slanting wall 36 and the faces represented by the partitions 5, 5a. The lower part of the anoxid zone 4b of the activation space 4 is tapered (FIG. 10) and is provided with a mechanical equipment, according to this exemplifying embodiment with a paddle-wheel agitator 37.

This paddle-wheel agitator 37 consists both from load-bearing wheel 39 from a usual material, e.g. from metal or plastics, on which at its circumference a system of cups 40 is placed, and from paddle-wheel 45 provided with paddles 46. The load-bearing wheel 39 and the paddle-wheel 45 are pivoted by means of a vertically arranged shaft 38, which is located at one side on a partition 5 and at the other side on the other partition 5. The shaft 38 comes through this second partition 5 into the oxid zone of the activation space 4. This arrangement may be vertically sliding to adjust it for various conditions for purification of the water, e.g. for various height of the mixed liquor. The load-bearing wheel 39 with the cups 40 is situated in the oxid zone 4a and it is overhung on the part of the shaft 38 in the oxid zone 4a of the activation space 4. The paddle-wheel 45 is located inside of the anoxid zone 4b of the activation space 4.

The neck level of each cup 40 is preferably parallel with the shaft 38. The paddles 46 are arranged in radial direction in view of the shaft 38 and they are preferably push fitted in the radial direction on their supports 47.

To the load-bearing wheel 39 belongs an air admission, e.g. one of the aerating elements 16 (FIG. 8), which is located at that side of the load-bearing wheel 39, where the cups 40 are turned with the neck downwards.

The anoxid zone 4b of the activation space 4 is interconnected both with lower part of the catch pit 6 through a connecting pipe 34 and with the oxid zone 4a through the connecting outlet 41. The connecting pipe 34 is connected with the anoxid zone 4b at its bottom. The connecting outlet 41 connects the oxid zone 4a with the anoxid zone 4b of the activation space 4 near to the shaft 38 of the paddle-wheel agitator 37.

The oxid zone 4a of the activation space 4 is divided by the inserted anoxid zone 4b into two sections (FIGS. 8, 9), which are mutually connected through passages 43 (FIG. 10) which are formed between the casing 1 and the tank bottom and the slanting wall 36. Another aerating elements 16 are situated in the oxid zone 4a according to the need. At least one aerating element 16 is always located in the outlet region of a passage 43 and in the opposite outlet region of another passage 43 (FIG. 8).

The interconnection between the oxid zone 4a of the activation space 4 and the separation space 2 is performed through the passage 32 (FIG. 9) made in the wall 3 at the tank bottom.

Figure 10:
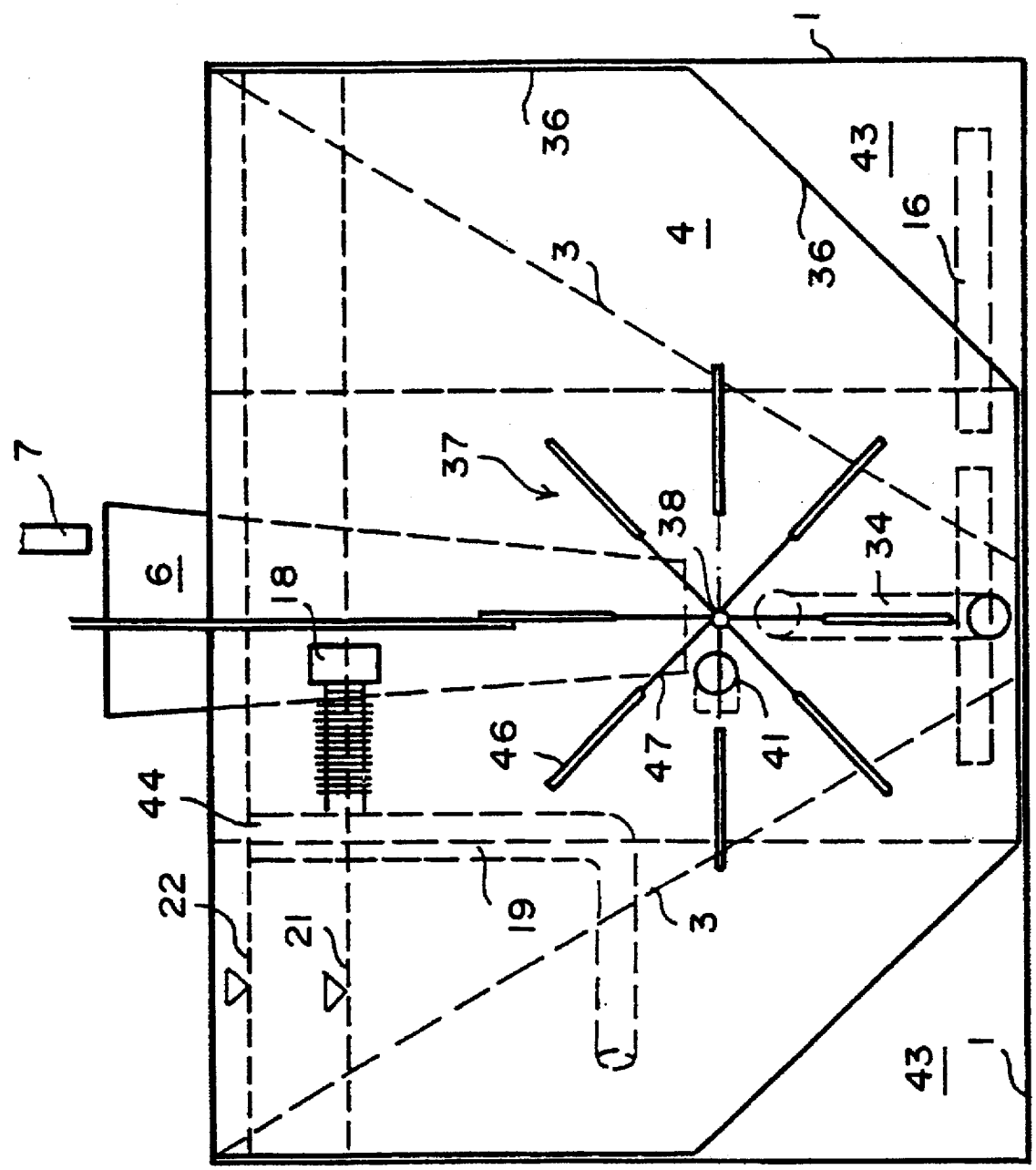

A floating withdrawal equipment 18 for removal of the purified water with an outlet 19 is located on the level of the separation space 2 (FIG. 10). The lowest position of the floating withdrawal equipment 18 is set by a stop (not shown) and the spillway (not shown) of the floating withdrawal equipment 18 is set at a certain maximum withdrawal, e.g. not exceeding the double of the average whole day hydraulic load of the reactor.

The level 21 of the reactor is in the lowest position during an average load of the reactor and during a short-time hydraulic overload it rises and it may reach the highest level 22. The highest level 22 is set by the position of the breakdown spillway 44 (FIG. 9). The apparatus is provided with a sludge discharge tube 23 for removal of excess sludge (FIGS. 8, 9), which preferably mouths in the upper part of the activation space 4.

The function of the apparatus for biological sewage purification is as follows:

Raw sewage flows through the admission 7 into the catch pit 6 for coarse impurities. The mixed liquor from the catch pit 6 flows through the connecting pipe 34 into the anoxid zone 4b of the activation space 4. Suspendation of the activated sludge is maintained in the anoxid zone 4b of the activation space 4 by the motion of the paddle-wheel agitator 37, the slight turning of which is caused by the effects of hydraulic forces on the system of cups 40 on the load-bearing wheel 39. The cups 40 catch the air bubbles coming from the aerating element 16 located under them, this air forces water out of them, then the cups 40 are lifted a bit by the hydrostatic forces and so they create driving force for the motion of the paddle-wheel agitator 37. The downwards tapering anoxid zones 4b of the activation space 4 create together with the function of the paddle-wheel agitator 37 good conditions for maintaining of the activated sludge in suspendation or for setting the settled activated sludge in suspendation. It is also possible to combine this mechanical agitating with the agitating by means of supplied air, but it is necessary then to arrange the air supply also in the anoxid zone 4b, and it is possible to suspend the air supply or also the whole purification process, because the paddles 46 may raise also entirely settled mixed liquor again.

The raw sewage flows through the admission 7 into the catch pit 6 for coarse impurities, from which it streams relieved from coarse impurities through connecting pipe 34 into the anoxid zone 4b of the activation space 4. The connecting pipe 34 is led through the oxid zone 4a (FIG. 9) but it doesn't communicate with it. The mixed liquor streams from the anoxid zone 4b into the oxid zone 4a of the activation space 4 through the connecting outlet 41. So a spiral flow of the mixed liquor from the inlet into the anoxid zone 4b to its center near to the shaft 38 of the paddle-wheel agitator is created. Through this optimal flow is provided a sufficient resident time of the purified water in the anoxid zone 4b with a complete activated sludge suspendation.

The oxid conditions are created in the oxid zone 4a of the activation space 4 by aeration by means of the aerating elements 16. The above mentioned arrangement of the aerating elements 16 causes circulating streaming between the both sections of the oxid zone 4a of the activation space 4, which is partitioned off by an inserted anoxid zone. Said circulation flow is made by the passages 43 possible and is caused by the aerating elements 16 always at the outlet from the passages 43. The streaming of the mixed liquor at the outlet from the passages caused by the air getting off from the aerating elements, creates a suction effect in the passages, whereby the mixed liquor in the oxid zone 4a begins to flow in the circulating way. By means of other aerating elements 16 is brought the air for perfect suspension of the activated sludge in the oxid zone 4a of the activation space 4 and the oxygen for biological purification processes. It is possible to put a entirely suspended activated sludge in suspendation by means of the aerating elements 16.

The described perfect suspension of the activated sludge both in the oxid zone 4a and in the anoxid zone 4b of the activation space 4 makes it possible to put intermittent aerating into practice, and this results in power savings and increased efficiency of the denitrification.

The separation space 2 communicates with aerated oxid zone 4a of the activation space 4 through the passage 32, through which the mixed liquor is taken away from the activation space into the separation space. This simple solution of the mixed liquor admission into the separation space 2 is enabled by the intense recirculation of the mixed liquor in the circulation circuit with its withdrawal near to the bottom of the separation space 2 by means of the suction inlet 9 of the recirculation set 8.

Suspended activated sludge is separated from the mixed liquor in the separation space 2 through fluidized bed filtration. The activated sludge suspension caught in the fluidized bed filter falls in the lower part of the separation space 2, from which it is pumped by the recirculation set 8 and transported back through the catch pit 6 in the anoxid zone 4b of the activation space 4. So an internal circulation circuit in the reactor is created, in which all processes of biological sewage purification take place, i.e. biodegradation, nitrification, denitrification, dephosphatization, with a following separation of the activated sludge and its return back in the process of biological sewage purification.

The purified water is after separation of the activated sludge through fluidized bed filtration taken away by the floating withdrawal equipment 18.

The removal of the excess activated sludge is performed periodically by means of a car for feces disposal. The excess activated sludge is sucked with the reactor working so that a part of the mixed liquor is sucked off in a car for feces disposal.

The described system of suspension of activated sludge in the anoxid zone 4b of the activation space 4 using the paddle-wheel agitator 37 and aerating oxid zone 4a of the activation space 4 makes the function of the apparatus with a high concentration of activated sludge possible. This makes among other things possible to reduce the size of the reactor and so to cut its price and reduce the space claims.

All processes of complex biological purification are realized in the reactor by the described purification process. So organic and nitrogen containing compounds and also in a considerable degree phosphates from sewage are removed and at the same time it is reached a high degree of stabilization of the produced activated sludge.

EXAMPLE 5

Figure 11:
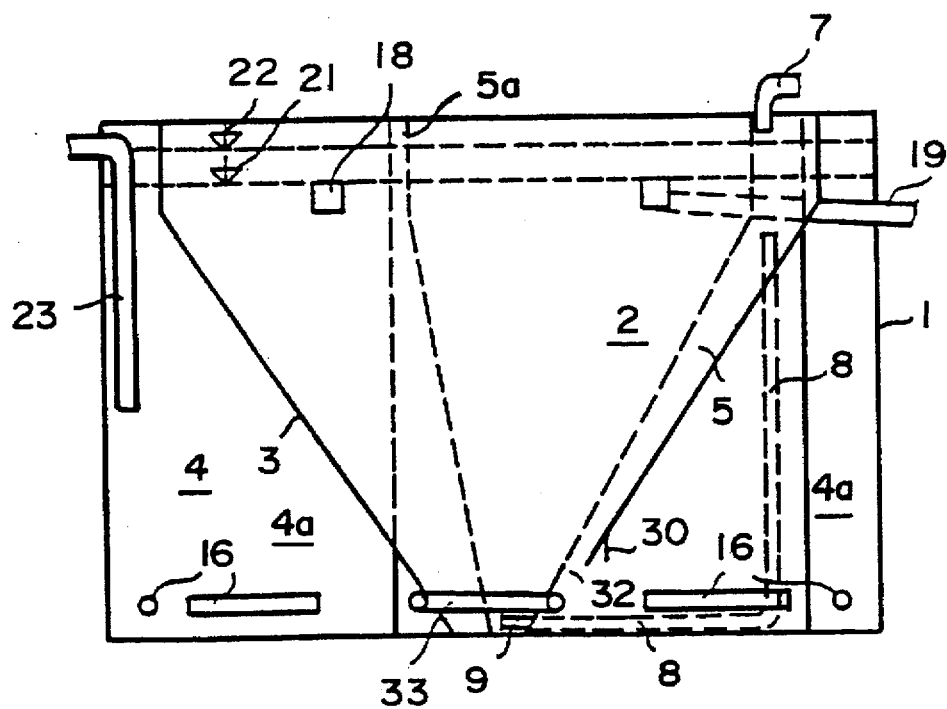
Figure 12:
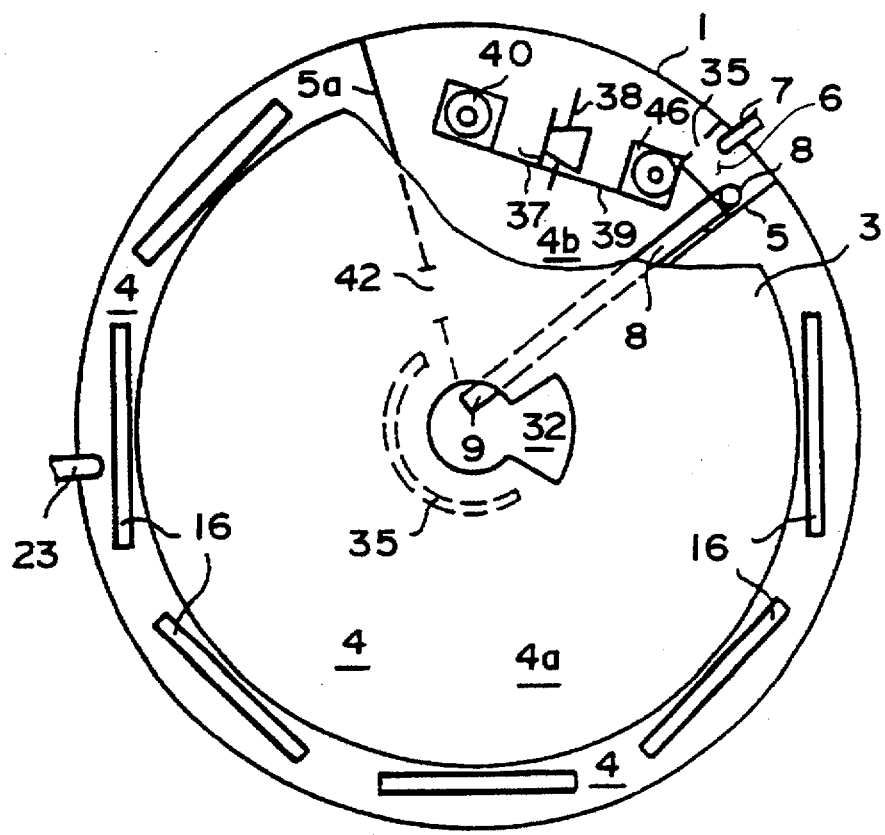

Another variant of the reactor suitable especially for domestic sewage plants is shown in FIGS. 11, 12. There is an upwards widening separation space 2 in the form of a truncated cone or pyramid created by the partition wall and situated in a tank with a casing 1, preferably of a cylindrical form. The upper part of the separation space 2 merges in a cylindrical or prismatic form. The partition walls 3 of the separation space 2 bear either directly or through its weight-carrying elements (not shown) on the tank bottom. The arrangement of the separation space is concetric, as it is in the exemplifying embodiment (FIGS. 11, 12) or it may be also eccentric, e.g. the separation space 2 may be in contact with the casing 1 of the tank. The partition walls 3 may be produced from a smooth material or from a profiled material. It is advantageous to make the shaping in the direction from above downwards and to create so low ribs at the surface of the partition walls 3. An activation space 4 is formed between the partition wall 3 and the casing 1 and it is divided into an oxid zone 4a and anoxid zone 4b (FIG. 12). The anoxid zone is partitioned from the as a rule bigger oxid zone 4b by partitions 5, 5a. The lower part of the anoxid zone 4b of the activation space 4 is provided with a mechanical agitator represented e.g. by a mechanical agitator 37 (FIG. 12). The paddle-wheel agitator 37 is pivoted by means of a vertically arranged shaft 38 (FIG. 12) which is placed on a construction (not shown). Unlike the exemplifying embodiment according to FIGS. 8 to 10 the load-bearing wheel 39 with the cups 40 and the paddle-wheel agitator 37 are situated in the anoxid zone 4b of the activation space 4, possibly the paddle-wheel 37 and the load-bearing wheel 39 make one whole. The air causing the rotary motion of the paddle-wheel 37. disturbs not at all the anoxid environment in the anoxid zone 4b because most of the air gets in the cups 40 up to the level and then escapes in atmosphere.

An air supply (not shown) is arranged to the load-bearing wheel 39 and it is located on that side of the load-bearing wheel 39, where the cups are turned with the neck downwards.

A catch pit 6 (FIG. 12) for coarse impurities is arranged to the casing 1 of the reactor and to the partition 5 in the anoxid zone 4b of the activation space 4 and admission of raw sewage mouths in said catch pit. A recirculation set 8 represented e.g. by an air-lift pump is located in the catch pit 6 and the suction inlet 9 of said recirculation set 8 is situated at the bottom of the separation space 2.

The anoxid zone 4b of the activation space 4 is interconnected both with the catch pit 6 through the connecting opening 35 and with the oxid zone 4a through connecting opening 42 formed in the partition 5a at the tank bottom (FIG. 12).

The aerating elements 16 are arranged in the oxid zone 4b in a similar way as in Example 4. The interconnection between the oxid zone 4a of the activation space 4 and the separation space 2 is performed through the passage 32 formed in the wall 3 at the tank bottom in front of the partition 5 (FIG. 12). There is a stream baffle 30 (FIG. 11) located over the passage 32 and said baffle 30 is preferably fixed to the wall 3. It is also possible to leave out the baffle 30. The suction inlet 9 of the recirculation set 8 mouths at the bottom of the separation space 2 and the outlet from the recirculation set mouths in the catch pit 6.

An aerating piping in the form of an arch is located in the oxid zone 4b of the activation space 4 at the tank bottom and to the wall 3 and its beginning is located by the partition 5a and the end in front of the passage 32 (FIG. 11). The sludge discharge tube 23 for withdrawal of excess activated sludge is led from the activation space.

The floating withdrawal equipment for purified water with an outlet 19 is placed in the upper part of the separation space 2, where its position also sets the height of level and it is entirely identical as in preceding exemplifying embodiment. The floating withdrawal equipment 18 may be replaced in bigger reactors with a fixed withdrawal equipment (not shown).

The function of this exemplifying embodiment is similar to that in the preceding embodiment:

Raw sewage flows through the admission 7 into the catch pit 6 for coarse impurities. The mixed liquor from the catch pit 6 flows through the connecting opening 35 into the anoxid zone 4b of the activation space 4. The suspendation of the activated sludge is maintained in the anoxid zone 4b of the activation space 4 by the turning motion of the paddle-wheel agitator 37. The turning is caused by the effects of hydraulic forces on the system of cups 40 on the load-bearing wheel 39. The cups 40 catch the air bubbles coming from the air supply (not shown) located under them. Said air supply is preferably connected with a pressure air supply (not shown) meant also for aerating in the oxid zone of the activation space 4. The brought air pushs out the liquid from the cups 40, which are lifted a bit by that and produce the driving force for turning motion of the paddle-wheel agitator 37. This creates good conditions for maintaining of the activated sludge in suspendation or for setting the activated sludge in suspendation again after a time period when the aerating have been interrupted and so also the agitating by the paddle-wheel agitator 37 in the anoxid zone 4b. The possibility to interrupt the aerating during the purification process brings about a power savings and increases the efficiency of denitrification process by creating a temporary oxygen shortage in the whole volume of the mixed liquor in the tank.

The mixed liquor streams from the anoxid zone 4b through the connecting opening 42 into the oxid zone 4a. The oxid conditions are created in the oxid zone 4a of the activation space 4 through aerating by means of aerating elements 16. So at the same time the conditions for perfect suspension of the activated sludge during the aerating and for bringing the suspended activated sludge in suspendation again after temporary interruption of the aeration or after lowering its intensity are created. The aerating piping 33 is meant especially for increasing of the aerating efficiency by setting the suspended activated sludge in suspendation again.

The separation space 2 communicates with the aerated oxid zone 4a through the passage 32, through which the mixed liquor is taken away from the activation region into the separation space. The baffle 30 limits the transfer of the turbulence from the activation region into the separation region.

The suspended activated sludge is separated from the mixed liquor in the separation space 2 through fluidized bed filtration. The suspension of the activated sludge caught in the layer of the fluidized bed filter goes down in the lower part of the separation space 2, from which it is pumped together with the mixed liquor from the oxid zone 4a through the catch pit 6 back in the anoxid zone 4b of the activation space 4 by means of the recirculation set 8. So an internal circulation circuit is created in the reactor and in said circuit are realized all linking up processes of biological sewage purification, i.e. biodegradation, nitrification, denitrification, dephosphatization, with a following separation of the activated sludge and its return back in the process of biological sewage purification. Because the denitrification intensity in this system of biological purification with nitrification following the denitrification is determined by the flow intensity of the mixed liquor in the circulation circuit, it is described by the expression:

$$\tau [\%] = \frac{n}{n+1} \times 100,$$

wherein $\tau$ is the denitrification efficiency in percent and n is proportion of the rate of flow in the circulation circuit to the quantity of the admitted raw water in the same time period.

To remove e.g. 75% of the nitrates is a triple flow intensity in the circulation circuit than the intensity of purified water admission necessary. That is why the intensity of pumping by the recirculation set 8 in the lower part of the separation space 2 is usually chosen higher than triple of the admitted quantity of the purified water. The circulation of the mixed liquor in this quantity secures not just the needed efficiency of the denitrification processes but also advantageous hydraulic conditions for the separation in the fluidized bed filter in the separation space 2, because this circulation contributes to the limitation of the disturbing flows transfer from the aerated oxid zone 4a through the passage 32 into the separation space 2.

The flow of the mixed liquor is in the oxid zone 4a of the activation space 4 from the connecting opening 42 to the passage 32 spiral together with the horizontal component of the plug flow, and so the conditions for biological biodegradation and oxidation processes of purification are created.

The purified water is after separation of the activated sludge through fluidized bed filtration taken away by the float withdrawal equipment 18 in the same way as in the preceding exemplifying embodiment according to FIGS. 8 to 10. This makes it possible to compensate short-time hydraulic overload, which is considerably high in the smallest sewage sources.

The withdrawal of the excess activated sludge is performed periodically through the sludge discharge tube 23 and it is transported by the car for feces disposal.

The total intensity of biological purification processes depends on the concentration of the activated sludge in the purification system and this depends on the separation efficiency. The integral inserting of the fluidized bed filtration in the circulation circuit of the mixed liquor secures a high concentration of the activated sludge 6 to 10 kg/m$^3$. With such a concentration a very low sludge load is secured, which is necessary for high purification intensity and for needed sludge biodegradation. The high degree of biodegradation is shown in a small production of excess sludge, which contributes to a significant economy of the whole process.

In addition the processes with a high content of the activated sludge allow to reduce the size of the reactor and so to cut its price and reduce the space claims during its fitting.

EXAMPLE 6

Figure 13:
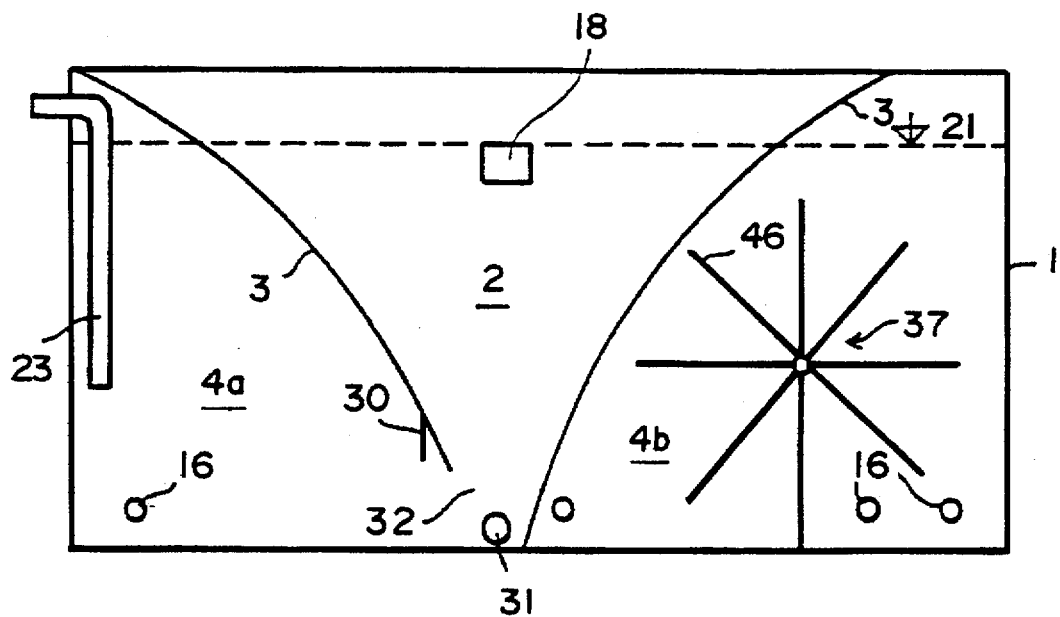
Figure 14:
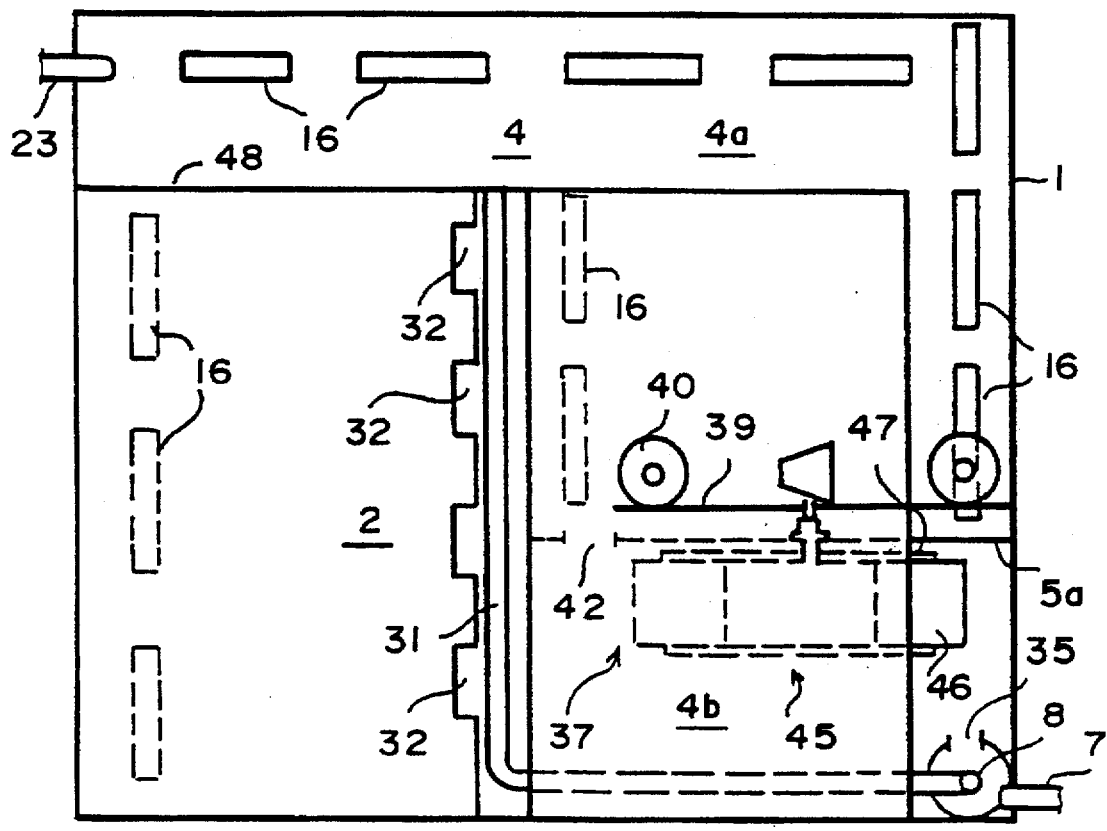

Another exemplifying embodiment of the reactor according to the invention is shown in FIGS. 13 and 14 preserving all substantial features.

A separation space 2 for fluidized bed filtration is formed in the right-angled tank with a circumferencial casing 1 by partition walls 3 in the form of an arch. The separation space 2 is arranged with one face being directly attached to the casing 1, so one face of the separation space 2 is identical with the casing 1. The separation space 2 is partitioned at the opposite side from the activation space 4 by the face 48 (FIG. 14). The partition wall 3 may be produced from a smooth material or from a profiled material. It is advantageous to make the profiling in the direction from above downwards, and so low ribs are created at the surface of the partition walls 3.

The activation space 4 is bounded by the casing 1, the partition walls 3 and the face 48 and is partitioned into two parts, i.e. anoxid zone 4b and aerated oxid zone 4a. It is possible to locate a catch pit 6 for coarse impurities in the anoxid zone 4b of the activation space 4, and the admission 7 for sewage mouths in this catch pit 6. A recirculation set 8 represented e.g. by an air-lift pump is situated in the catch pit 6. The recirculation set 8 is connected with a perforated collecting pipe 31 situated on the bottom of the separation space 2. The anoxid zone 4b of the activation space 4 is provided with a mechanical agitating equipment 37, according to the exemplifying embodiment with a paddle-wheel agitator 37 (FIGS. 13, 14) which is performed in the same way as in the Example 4 as shown in FIGS. 8 to 10.

The anoxid zone 4b is connected both with the catch pit 6 through the opening 35 and with the oxid zone 4a through the connecting opening 42 formed in the partition 5a (FIG. 14) at the bottom of the tank. The interconnection between the oxid zone 4a of the activation space 4 and the separation space 2 is formed by the passage 32 in the partition wall 3, preferably along the whole length of the separation space 2. It is also possible to form a system of passages 32 along the whole length of the separation space 2. The arched partition walls 3 are fastened to the bottom and to the casing 1 of the tank. At least one flow baffle 30 is arranged in the region of the passage 32 to the partition wall 3 at the side of the oxid zone 4a of the activation space 4. It is intended to deflect the flow of the mixed liquor in the oxide zone 4a of the activation space 4. The baffle 30 is preferably fastened to the partition wall 3 and is arranged vertically and goes substantially along the whole length of the partition wall 3. It is also possible to arrange several baffles 30 along the whole length of the partition wall 3. The baffle 30 is located near to the lower part of the partition wall 3, and its lower edge is situated rather above the lower edge of the partition wall 3. But it is also possible to leave cut the baffle 30. If the baffle 30 is used, it restricts the transfer of turbulence from the activation region into the separation region.

Figure 2:
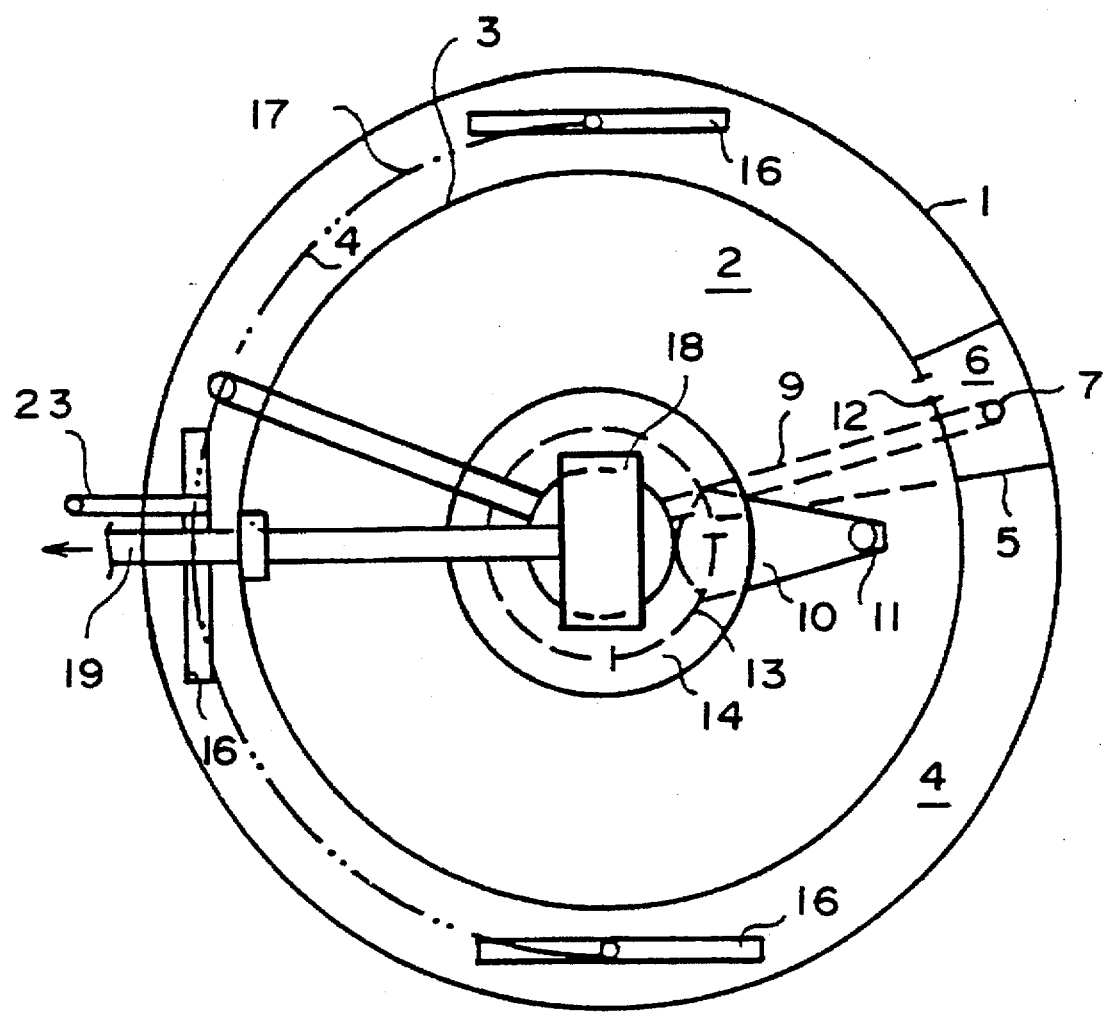

The passage 32 connects just one side of the separation space 2 with the oxid zone 4a, which is the end part of the activation space 4 at the side reverse from admission 7 for raw sewage. The floating withdrawal equipment or fix withdrawal equipment 18 for purified water with its outlet 19 is situated at the level of the separation space 2. Using the floating withdrawal equipment its embodiment is identical with the embodiment according to Example 1 as shown in FIGS. 1 to 3.

The reactor is provided with sludge discharge tube 23 for removal of excess activated sludge.

The function of this exemplifying embodiment is similar to that in the preceding embodiment:

Raw sewage flows through the admission 7 into the catch pit 6 for coarse impurities, where the raw sewage is mixed with the mixed liquor brought by the recirculation set 8. This mixture flows from the catch pit 6 through the connecting opening 35 into the anoxid zone 4b of the activation space 4, wherein denitrification is realized without oxygen admission. The activated sludge is maintained in suspendation by the paddle-wheel agitator 37, the operation of which is identical with the preceding embodiments.

The mixed liquor gets from the anoxid zone 4b through the connecting opening 42, formed in the partition 5a at the tank bottom, into the oxid zone 4a of the activation space 4, where aeration is performed by means of aerating elements 16. From the oxid zone 4a of the activation space 4 the mixed liquor flows through the passage or passages 32 into the separation space 2. The activated sludge is separated in the separation space 2 in the fluidized bed filter, purified water is taken away by the withdrawal equipment 18 and activated sludge goes down to the bottom of the separation space 2. There it is sucked into the collecting pipe 31 of the recirculation set 8 and led into the catch pit 6. So the internal circulation circuit of the reactor is closed. The driving force for the circulation of the mixed liquor in the circulation circuit is the recirculation set 8 and raw sewage admission into the catch pit 6.

Geometric configuration of the reactor according to the invention is not limited to above described examples. There exists a number of different possible configurations obeying the declared principles of the invention, and a particular choice can be made according to the material and manufacturing technology used. For example, using plast pressing technology, the reactor casing 1 can be kettle-shaped or have another statically advantageous shape, not having flat or cylindrical parts. Similarly, the shapes of separation space 2 and anoxid zone 4b of the activation space 4 can be adapted to the shape of the casing 1.

INDUSTRIAL APPLICABILITY

The apparatus according to the present invention is suitable for small and smallest biological sewage plants, especially to purify the local isolated sewage sources. A high quality of purified water may be used preferably for Brown-Water-Concept system using purified water from kitchens, bathrooms and laundries for sanitary purposes achieving a high drinking water saving. But it is also possible to adapt the size of the apparatus to purification of sewage from medium-sized contamination sources, e.g. from hotels and housing estates.

List of parts 1 casing
2 separation space
3 wall
4 activation space
5 partition
6 catch pit
7 admission of the raw sewage
8 recirculation set
9 suction inlet
10 transferring passage
11 inlet opening
12 outlet
13 passage
14 sludge trap
15 outlet
16
17
18 floating withdrawal equipment
19 outlet
20 stop
21-

22-
23 sludge discharge tube
24 inlet passage
25 outlet
26 connecting opening
27 inlet passage
28-
29 connecting opening
30 stream baffle
31 collecting pipe
32 passage
33 aerating piping
34 connecting pipe
35 connecting opening
36 slanting wall
37 paddle-wheel agitator
38 shaft
39 load-bearing wheel
40 cup
41 connecting outlet
42 connecting opening
43 passage
44 breakdown spillway
45 paddle-wheel-
46 paddle
47 support
48 face

We claim:

1. A reactor for biological sewage purification comprising a tank comprising a casing and a bottom surface, a funnel-shaped member defining a separation space therein for fluidized bed filtration, said funnel-shaped member positioned on said bottom surface of said tank and spaced from said casing and defining an activation space about said funnel-shaped member, said funnel-shaped member defining at least one passage communicating with said separation space and said activation space proximate said bottom surface of said tank, a first partition extending from said casing to said funnel-shaped member, recirculation means defining a suction inlet communicating with said separation space, and an outlet communicating with said activation space, and a circulation circuit for circulating fluid between said activation space and said separation space.

2. The reactor as defined in claim 1 wherein said funnel-shaped member comprises an upper conical portion and a lower cylindrical portion connected at the truncated end of said conical portion and defining an inlet therebetween.

3. The reactor as defined in claim 1 wherein said funnel-shaped member defines a transferring passage having an inlet proximate a first side of said first partition, said transferring passage extending at least one quarter the height of the funnel-shaped member, said reactor further comprising a hollow member within said casing on the other side of said first partition and defining a catch pit therein, said recirculation means displaced within said hollow member, said recirculation means having said outlet communicating with said activation space on said other side of said first partition.

4. The reactor as defined in claim 3 wherein a portion of said first partition is integral with a portion of said hollow member.

5. The reactor as defined in claim 3 further comprising a second partition between said funnel-shaped member and said casing of said tank and spaced from said first partition, and defining with said first partition an oxide zone and an anoxide zone within said activation space.

6. The reactor as defined in claim 5 wherein said transferring passage communicates through said inlet with said oxide zone of said activation space and said separation space, said outlet for said recirculation means communicates with said anoxide zone of said activation space and said separation space, and said suction inlet of said recirculation means is proximate the bottom of said funnel-shaped member.

7. The reactor as defined in claim 5 wherein said second partition defines a connecting opening proximate said bottom of said tank.

8. The reactor as defined in claim 7 wherein said first partition defines a connecting opening proximate said bottom of said tank.

9. The reactor as defined in claim 1 wherein said funnel-shaped member has a part-of-pyramid or a part-of-cone shape eccentrically displaced in said tank, and a portion of said funnel-shaped member is integral with a portion of said casing of said tank.

10. The reactor as defined in claim 1 wherein said funnel-shaped member has a pyramid or a cone shape.

11. The reactor as defined in claim 1 further comprising flow withdrawal means for removing purified water from said separation space in said funnel-shaped member.

12. The reactor as defined in claim 11 further comprising said flow withdrawal means including a stop and a spillway and defines an outlet communicating with said separation space.

13. The reactor as defined in claim 4 further comprising a floated sludge trap within said separation space and means for supplying air under pressure to said sludge trap.

14. The reactor as defined in claim 13 wherein said floated sludge trap defines an outlet communicating with said activation space.

15. The reactor as defined in claim 4 wherein said hollow member defines an outlet communicating with said anoxide zone of said activation space and said catch pit.

16. The reactor as defined in claim 3 wherein said hollow member is disposed within said funnel-shaped member.

17. The reactor as defined in claim 5 wherein said oxide zone is disposed about said anoxide zone; and said anoxide zone separates said oxide zone into two sections in communication with each other.

18. The reactor as defined in claim 5 wherein said funnel-shaped member is concentrically disposed within said tank and said first and said second partitions extend vertically from said casing to said funnel-shaped member and define said anoxide zone.

19. The reactor as defined in claim 1 wherein said funnel-shaped member comprises two upwards-widening, arched partition walls and a pair of parallel plane faces, one of said plane faces integral with said casing of said tank.

20. The reactor as defined in claim 5 wherein said funnel-shaped member has a second passage at its lower portion communicating with said activation space and said separation space.

21. The reactor as defined in claim 20 further comprising a flow baffle extending from said funnel-shaped member proximate said second passage.

22. The reactor as defined in claim 5 further comprising mechanical agitating means in said activation space, said agitating means including a pivoted load-bearing wheel, a plurality of cups positioned about the periphery of said load-bearing wheel, an air supply means proximate one side of said load-bearing wheel, and a paddle-wheel agitator coupled to said load-bearing wheel.

23. The reactor as defined in claim 17 further comprising mechanical agitating means in said activation space, said agitating means including a pivoted load-bearing wheel, a plurality of cups positioned about the periphery of said load-bearing wheel, an air supply means proximate one side of said load-bearing wheel, and a paddle-wheel agitator coupled to said load-bearing wheel.

24. The reactor as defined in claim 22 further comprising a shaft coupling said load-bearing wheel to said paddle-wheel agitator.

25. The reactor as defined in claim 24 wherein said paddle-wheel agitator comprises a plurality of supports attached to said shaft, and an agitating paddle arranged on each of said supports.

26. The reactor as defined in claim 22 wherein said load bearing wheel is in said oxide zone, and wherein said paddle wheel agitator is in said anoxide zone.

27. The reactor as defined in claim 22 wherein each of said agitating paddles of said paddle wheel agitator lies substantially in a plane going through the axis of rotation of said load-bearing wheel, each of said cups secured to said load-bearing wheel by a neck member, each of said neck members being parallel to the axis of rotation of said load-bearing wheel.

28. The reactor as defined in claim 22 wherein said anoxide zone tapers downwardly to the bottom of said tank.

29. The reactor as defined in claim 23 further comprising a pair of slanting walls each extending from said casing to said bottom of said tank and between said first partition and said second partition and defining said anoxide zone therein, and further defining a pair of passages with said casing and said bottom of said tank communicating with said two sections of said oxide zone.

30. The reactor as defined in claim 17 further comprising aerating elements in said oxide zone.

31. The reactor as defined in claim 17 further comprising a first conduit communicating with said anoxide zone and said catch pit, and a second conduit communicating with said oxide zone and said anoxide zone.

32. The reactor as in claim 1 further comprising a sludge discharge tube defining an inlet communicating with said activation space and an outlet for removing excess activation mixture.

* * * * *